United States Patent
Richardson

(10) Patent No.: US 9,092,985 B2
(45) Date of Patent: Jul. 28, 2015

(54) NON-KINEMATIC BEHAVIORAL MAPPING

(71) Applicant: Raytheon Company, Waltham, MA (US)

(72) Inventor: James J. Richardson, Temecula, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 13/966,697

(22) Filed: Aug. 14, 2013

(65) Prior Publication Data
US 2014/0163858 A1 Jun. 12, 2014

Related U.S. Application Data

(62) Division of application No. 12/791,169, filed on Jun. 1, 2010, now Pat. No. 8,538,675.

(60) Provisional application No. 61/182,877, filed on Jun. 1, 2009.

(51) Int. Cl.
*G08G 1/16* (2006.01)
*G06N 7/02* (2006.01)
*G06K 9/00* (2006.01)

(52) U.S. Cl.
CPC ............ *G08G 1/166* (2013.01); *G06K 9/00785* (2013.01); *G06N 7/02* (2013.01)

(58) Field of Classification Search
CPC ...... G08G 1/166; G06K 9/00785; G06N 7/02
USPC ............... 701/301; 340/944, 435, 436, 425.5, 340/463, 468, 474
See application file for complete search history.

(56) References Cited

U.S. PATENT DOCUMENTS

| | | | |
|---|---|---|---|
| 5,548,694 A * | 8/1996 | Frisken Gibson | ............ 345/424 |
| 6,036,053 A | 3/2000 | Simmons et al. | |
| 6,472,978 B1 | 10/2002 | Takagi et al. | |
| 6,985,696 B2 | 1/2006 | Bromham et al. | |
| 7,036,621 B2 | 5/2006 | Takafuji et al. | |
| 7,211,980 B1 | 5/2007 | Bruemmer et al. | |
| 7,380,633 B2 | 6/2008 | Shen et al. | |
| 7,587,269 B2 | 9/2009 | Kamichi et al. | |
| 7,617,725 B2 | 11/2009 | Howayshell | |
| 7,671,048 B2 | 3/2010 | Knust et al. | |
| 2004/0246114 A1 | 12/2004 | Hahn | |
| 2005/0107954 A1 | 5/2005 | Nahla | |
| 2006/0190175 A1 | 8/2006 | Moriizumi et al. | |
| 2006/0274149 A1 | 12/2006 | Yoshizawa | |
| 2008/0077296 A1 | 3/2008 | Kawasaki | |

(Continued)

OTHER PUBLICATIONS

Banias et al.; "Problem Setting and Modelling in Vehicles and Pedestrians Traffic Control Suing Sensor Networks;" IEEE 2007 International Symposium on Applied Computational Intelligence and Informatics; XP-031184621; May 1, 2007; pp. 83-88.

(Continued)

*Primary Examiner* — Marthe Marc-Coleman
(74) *Attorney, Agent, or Firm* — Daly, Crowley, Mofford & Durkee, LLP

(57) ABSTRACT

A system and methodology/processes for non-kinematic/behavioral mapping to a local area abstraction (LAA) includes a technique for populating an LAA wherein human behavior or other non-strictly-kinematic motion may be present.

14 Claims, 16 Drawing Sheets

(56) References Cited

U.S. PATENT DOCUMENTS

| | | | |
|---|---|---|---|
| 2008/0167821 | A1 | 7/2008 | Breed |
| 2009/0066499 | A1* | 3/2009 | Bai et al. .................... 340/459 |
| 2010/0100324 | A1 | 4/2010 | Caminiti et al. |
| 2010/0305858 | A1 | 12/2010 | Richardson |

OTHER PUBLICATIONS

Chen et al.; "Dynamic Environment Modeling with Gridmap: A Multiple-Object Tracking Application;" $9^{th}$ International Conference, IEEE Conference on Control, Automation, Robitics and Vision, XP-031103389; Dec. 1, 2006; 6 sheets.

Ess et al.; "Improved Multi-Person Tracking with Active Occlusion Handling;" IEE ICRA 2009 Workshop on People Detection and Tracking; Kobe, Japan; XP-002598301; May 2009; 6 sheets.

Ess et al.; "Moving Obstacle Detection in Highly Dynamic Scenes;" 2009 IEEE International Conference on Robotics and Automation; Kobe, Japan; May 12-17, 2009; pp. 56-63.

Gandhi et al.; "Image Based Estimation on Pedestrian Orientation for Improving Path Predicsion;" 2008 IEEE Intelligent Vehicles Symposium; Eindhoven, The Netherlands; Jun. 4-6, 2008; pp. 506-511.

Gindele et al.; "Bayesian Occupancy Grid Filter for Dynamic Environments Using Prior Map Knowledge;" 2009 IEEE Symposium on Intelligent Vehicles; Piscataway, NJ; XP-031489920; Jun. 3, 2009; pp. 669-676.

Linzmeier et al.; "Pedestrian Detection and Thermopiles using an Occupancy Grid;" 2004 International Transportation Systems Conference, Washington, DC; Oct. 3-6, 2004; pp. 1063-1068.

Nimmagadda; "Building an Autonomous Ground Traffic System;" XP-002598303; May 20, 2007; URL: http://www.cs.utexas.edu/fpt/pub.techreports/Hr09-09.pdf; pp. 1-27.

Schroder et al.; "Path Planning for Cognitive Vehicles using Risk Maps;" 2008 IEEE Intelligent Vehicles Symposium; Eindhoven, The Netherlands; Jun. 4-6, 2008; pp. 1119-1124.

Tay et al.; "The Bayesian Occupation Filter;" Probabilistic Reasoning and Decision Making Sensory Motor Systems; XP-002598302; Jul. 11, 2008; pp. 79-101.

Office Action; dated Aug. 2, 2012; for U.S. Appl. No. 12/791,169; 13 pages.

Response filed Sep. 6, 2012; to Office Action; dated Aug. 2, 2012; for U.S. Appl. No. 12/791,169; 6 pages.

Office Action; dated Nov. 24, 2012; for U.S. Appl. No. 12/791,169; 11 pages.

Response filed Sep. 6, 2012; to Office Action; dated Nov. 24, 2012; for U.S. Appl. No. 12/791,169; 8 pages.

Office Action; dated Jan. 9, 2013; for U.S. Appl. No. 12/791,169; 10 pages.

Response filed Apr. 8, 2013; to Office Action; dated Jan. 9, 2013; for U.S. Appl. No. 12/791,169; 9 pages.

Notice of Allowance; dated May 28, 2013; for U.S. Appl. No. 12/791,169; 8 pages.

PCT Invitation to Pay Additional Fees and Partial Search Report dated Sep. 7, 2010 for PCT/US2010/036822.

PCT Search Report of the ISA for PCT/US2010/036822 dated Dec. 29, 2010.

Written Opinion of the ISA for PCT/US2010/036822 dated Dec. 29, 2010.

International Preliminary Report on Patentability of the ISA for PCT/US2010/036822 dated Dec. 15, 2011.

U.S. Appl. No. 12/403,067, filed Mar. 12, 2009 (Toyota Ref. No. TEMA 2008-097/IP-A-451/TTC-67802).

U.S. Appl. No. 12/403,067, filed Mar. 12, 2009; 135 pages (Toyota Ref. No. TEMA 2008-097/IP-A-451/TTC-67802).

\* cited by examiner

US 9,092,985 B2

NON-KINEMATIC BEHAVIORAL MAPPING

CROSS REFERENCE TO RELATED APPLICATIONS

This application is a DIVISIONAL application of U.S. patent application Ser. No. 12/791,169 (filed Jun. 1, 2010), which claims priority under 35 U.S.C. §119(e) from U.S. Provisional Patent Application No. 61/182,877 (filed Jun. 1, 2009). Both applications are incorporated here by reference in their entirety for all purposes.

FIELD OF THE INVENTION

The concepts, systems and techniques described herein relate generally to pedestrian warning systems and more particularly to a method and apparatus for mapping current and future predicted object locations to a local area abstraction (LAA).

BACKGROUND OF THE INVENTION

As is known in the art, object detection systems for vehicle collision systems are known and used to convey the location of objects that could potentially collide with a vehicle. One previously known way to describe the location of an obstacle is to describe the latitude and longitude of the object. As the number of objects increases, however, the amount of information that must be transmitted to the vehicle also increases. The increase in the amount of transmitted information results in a concomitant increase in the amount of time required by vehicle-mounted systems to process the information. This results in a delay between the receipt of the object location information and a collision warning. This delay reduces valuable response time for a driver of the vehicle and thus makes it more difficult for a driver to take evasive action in order to avoid a collision.

As is also known, for objects moving with rectilinear or curvilinear motion, given a current position, speed and direction of an object, a future position of an object can be accurately predicted relatively easily using well-known kinematic equations of motion.

The motion of some objects, however, is unpredictable. Human beings, for example, do not typically adhere to the basic physics of object motion which can be described by kinematic equations of motion. Rather, human beings in motion are constantly adjusting their speed and direction based upon sensory input. This non-kinematic motion is very difficult (and in some cases, nearly impossible) to express using simple physics equations. Thus, predicting future positions for a pedestrian, for example, can be relatively difficult. In some applications, it is not possible to yield a single position with an acceptable degree of confidence.

BRIEF DESCRIPTION OF THE DRAWINGS

The foregoing features of the circuits and techniques described herein, may be more fully understood from the following description of the drawings in which.

SUMMARY OF THE INVENTION

Figure 1:
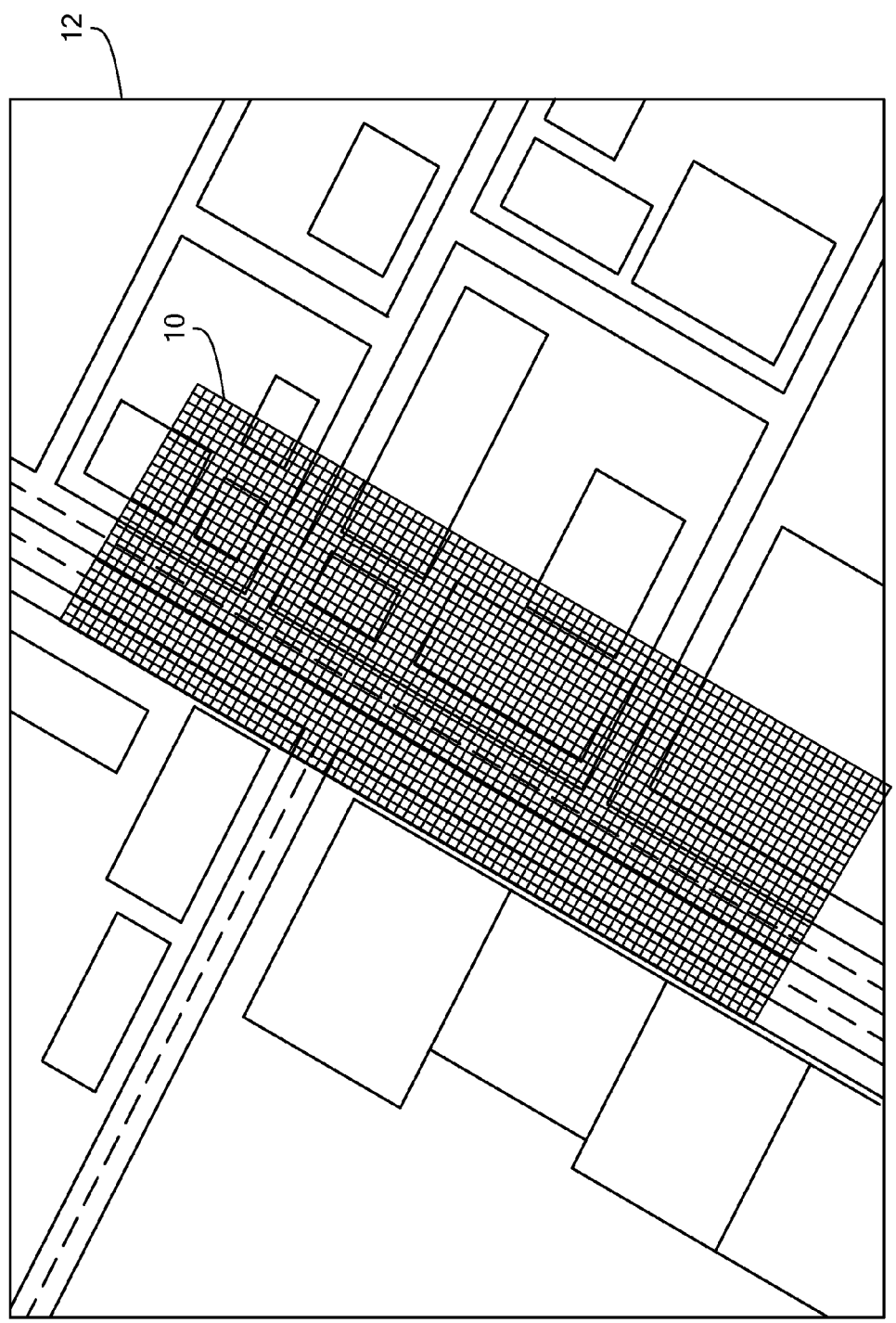
FIG. 1 is a top view of an intersection occupancy map (IOM) disposed over an image of a geographic location.

In view of the above, it has been recognized that there exists a need for an obstacle detection mapping system which can compactly represent the predicted future location distribution of one or more obstacles, and then rapidly and compactly transmit the location distributions to a vehicle for the purpose of collision detection and avoidance.

It has been found that utilizing a probability distribution mapping, which indicates where a moving object is likely to be at some future point in time, provides a technique to compactly represent the potentially-complex predicted future location of an obstacle. In one embodiment, a system and technique utilize a probability distribution mapping which indicates a location at which a pedestrian is likely to be at some future point in time. In one embodiment, for each target, the system can pass an amount of data which is approximately one-sixth the amount of data needed using conventional techniques. Thus, using the techniques described herein it is possible to decrease the amount of data transmitted to describe future target locations by approximately 84%. It should, of course, be appreciated that a significant benefit (some may say the principle benefit) of the system and techniques described herein is the ability to reflect complex probability distributions very simply. This results in a compact representation of a location of the pedestrian and is also desirable technique for providing a reliable, simple, yet useable means for expressing a pedestrian prediction probability distribution.

At least several concepts related to solutions for predicting pedestrian motion at future times are described herein. First is the use of a pedestrian occupancy map (POM) representation of a pedestrian probability distribution. This pedestrian-centered data map readily populates any Intersection Occupancy map (IOM) or other Local Area Abstraction (LAA). The POM may be used to reflect probability distributions from purely-kinematic motion, to purely random (as observed) motion, to any degree of non-strictly-kinematic motion in between. There is no need to derive an algorithm or equation to approximate the observed pedestrian behavior, which could prove difficult or impossible due to pedestrian "free will." The POM approach readily and accurately reflects pedestrian behavioral habits or tendencies using an aggregate statistical result of prior observed pedestrian behaviors. The surrounding environment of pedestrians is inherently accounted for when forming such aggregate statistical results.

Furthermore, the POM-based approach allows for the possibility of multiple independent future states separated by a "null space" whereas conventional techniques in the target tracking field solve for a single predicted state (position) and variance.

In the time domain, the concepts and techniques described herein allow for the accurate solution of multiple time-phased predictions as opposed to the single time-state solutions of most classical methods (e.g. Kalman filtering). These multi-time predictions can be chained together so as to eliminate the problem of "track gapping" experienced with discrete time solutions for high speed objects.

As used herein, the phrase "track gapping" refers to a situation which can arise in which a predicted path of an object (e.g. a pedestrian) crosses a path of a vehicle (e.g. a car) at such a time that a system does not provide any indication that a collision (or potential collision) between the two objects can or is about to occur. Thus, a "track gap" can be thought of as a "space" (or "gap") between where a car, for example, is computed at time $t_n$ and time $t_{n+1}$. If a pedestrian is in the gap, then it is not possible to precisely predict a collision between the car and the pedestrian.

Using conventional techniques to determine the car speed and gap length, it is possible to assign an artificial length to the car so that gaps are eliminated. For example, assuming a car has an actual length of fifteen feet, if the gap is determined to be twenty feet given the speed of the vehicle, then by artificially (e.g. mathematically) expanding the length of the car from fifteen feet to thirty-five feet, the gap is eliminated.

As mentioned above, however, in accordance with the concepts and techniques of the present disclosure, en accurate solution of multiple time-phased predictions (as opposed to the single time-state solutions of conventional techniques such as Kalman filtering) which can solve the track gap problem is provided. Such multi-time predictions can be chained together so as to eliminate the problem of "track gapping" experienced with discrete time solutions for high speed objects.

The concepts and techniques described herein also easily handle discrete-event inputs ("controls") that cause future predicted states to be non-continuous, again a case for which classical filtering methods are not ideally suited.

In addition to the POM concept, also described herein is a concept of the underlying process/algorithms for computing the exact overlap area for two convex polygons, in support of "cell POM" allocation to an LAA.

The methods and processes/algorithms described herein populate an Intersection Occupancy Map (IOM) or other local area abstraction (LAA) wherein human behavior or other non-strictly-kinematic motion is present. The IOM is a component of a uniquely beneficial interface design methodology for collision avoidance and other vehicular safety applications.

The methodology and process for non-kinematic/behavioral mapping to a local Area abstraction, sometimes referred to as the Pedestrian Prediction Logic (PPL), is a comprehensive methodology for populating an intersection occupancy map (IOM) or other local area abstraction (LAA) wherein human behavior or other non-strictly-kinematic motion is present. Possible applications include collision avoidance and other vehicular safety applications. This disclosure includes the solution methods of related geometry problems for which exact solutions have not previously been identified.

In accordance with a further aspect of the disclosure made herein, a computation-less collision detection methodology and system are described. Such a technique and system may be utilized in an object warning system such as a pedestrian warning system. In the computation-less collision detection technique, a collision determination pattern vector (CDPV) is provided in conjunction with a local area abstraction (LAA) of which a pedestrian intersection occupancy map (IOM) is one example.

For each greater-than-zero probability in IOM cells (denoted "i"), the value of the CDPV cell (denoted CDPV(i*)) is set equal to one (1) and all other CPDV(i*) cell values are set equal to zero. Next, a search or "hash" of CDPV for collisions of interest is performed (e.g. pedestrian-vehicle collision, vehicle-vehicle collisions or other collisions of interest).

It has thus been recognized that CPDV provides the ability to detect collisions within intersection occupancy map (IOM) data without performing any collision-specific calculations. This unique computation-less collision detection makes use of the CDPV data structure. As the IOM is populated with future projected object locations, a bit is set in the CDPV based upon each object's classification type grouping. In one embodiment, two bits are used for each grouping and the CDPV reflects if zero, one or more objects of any grouping is predicted in an IOM cell at a future time (with any non-zero probability).

A rapid search (e.g. a "hash") of the CDPV identifies the cell(s) containing configured collisions of interest (bit patterns) which are then further checked for collision alert thresholds. By design, certain types of collisions will be represented by certain bit patterns. For example, a pedestrian-vehicle collision is represented by a specific CDPV bit pattern. A simple configuration change, however, allows the system to also check for vehicle-vehicle collisions, or any other types of collisions.

Thus, while data is being transferred from a POM (or OOM) into an LAA, it is possible to also set CDPV bit patterns to perform computationless collision detection.

DETAILED DESCRIPTION OF THE PREFERRED EMBODIMENTS

Described herein is a system and methodology/processes for non-kinematic/behavioral mapping to a local area abstraction (LAA) including a methodology for populating an LAA wherein human behavior or behavior of other objects having other non-strictly-kinematic motion may be present. Before describing such a system and related processes, some introductory concepts and terminology are explained.

Reference is sometimes made herein to the use of systems and techniques in vehicular safety applications. One such vehicular safety application is referred to as a pedestrian warning system (PWS) which includes a pedestrian prediction logic (PPL) system which is an embodiment of a non-kinematic behavioral mapping system and related techniques used to predict pedestrian locations.

It should, of course, be appreciated that a PWS is but one specific example of a more general object warning system (OWS) and that the general concepts and techniques described herein are not limited to use within a PWS.

As used herein the phrase "local area abstraction" or "LAA" refers to a non-location-specific reference frame onto which positions of people and other objects can be projected or "mapped." This mapping can be for a present time (represented as "$t_0$") or some future or predicted time (represented as "$t_n$"). In an effort to promote clarity in the description of the concepts, systems and techniques described herein, reference is sometimes made herein to an LAA represented as a grid having a rectangular shape with a particular number of rows and columns (e.g. fifty rows and fifty columns). It should be appreciated that many different types of LAAs are possible, each of which may have different shapes and sizes including but not limited to circular shapes, triangular shapes, or regular or irregular shapes.

One particular type of LAA used in a pedestrian warning system (and in particular in a technique to predict pedestrian movement) is referred to as an "intersection occupancy map grid" or IOM grid. In one embodiment, an IOM grid is projected onto or over an image of a geographic location—typically an image (e.g. a Google Earth® image) where pedestrians are expected to be found moving amongst other objects such as vehicles (e.g. cars, trucks, and other motorized or non-motorized vehicles). It should, of course, be appreciated that an image is not required for the system to work (i.e. the techniques described herein do not require the image, per se). Rather, an image facilitates user visualization. Thus, an LAA overlays a geographic location and may be projected over an image of the geographic location for user visualization purposes. Also, again in an effort to promote clarity in the text and drawings in explaining the concepts, systems and techniques described herein, reference is sometimes made herein to an IOM grid having a rectangular shape with a particular number of rows and columns (e.g. ten rows and thirteen columns). It should, of course, be appreciated that IOM grids having different numbers of rows and columns may also be used. Furthermore, IOM grids having shapes other than rectangular may also be used. The particular shape and size of an IOM grid to be used in any particular application is selected in accordance with the needs and requirements of that particular application. Those of ordinary skill in the art will appreciate how to select the particular size and shape of an IOM grid for a particular application.

Reference is also made herein to a so called "pedestrian occupancy map grid" or "POM grid" or more simply a "POM." As will become apparent from the description herein below, a POM provides a representation of a pedestrian probability distribution. A POM grid is a pedestrian-centered data map which populates an IOM grid (or other LAA). The POM grid may be used to reflect probability distributions ranging from purely-kinematic motion, to purely random (as observed) motion, to any degree of non-strictly-kinematic motion in between. The POM may be thought of as a mini-map of the future positional probability distribution for an individual pedestrian or other non-strictly-Kinematic actor. Again, in an effort to promote clarity in the text and drawings in explaining the concepts, systems and techniques described herein, reference is sometimes made herein to a POM grid having a rectangular shape with a particular number of rows and columns (e.g. five rows and five columns). It should, of course, be appreciated that POM grids having different numbers of rows and columns may also be used. Furthermore, POM grids having shapes other than rectangular may also be used. The particular shape and size of a POM grid to be used in any particular application is selected in accordance with the needs and requirements of that particular application. In general, the size (height, width, area) of POM cells and the size of the POM grid (number of rows and columns) are selected to provide meaningful information. If the POM cells are selected to be too large, then little or no meaningful information can be gained. For example, if the POM cell has a square shape with each side equal to ten meters, then it would take a walking pedestrian a number of steps to move from one POM cell to another. Thus, in this example, no meaningful location data would be collected for many pedestrian steps, which would result in the POM cell processing techniques described herein being less effective than they could be. On the other hand, the overall POM grid size is preferably limited to reflect physically achievable states.

In general practice, IOM cells may be selected to be in the range of about 1-10 times the POM cell size. Thus, if a POM cell size is one-half meter, then the IOM cell size is preferably between one-half meter and five meters. In one embodiment, the POM cell size is typically selected to be no greater than one-half the size of an IOM cell. Thus, if the IOM cell has a square shape and each side is one meter, then the POM cell would also preferably be selected having a square shape with each side being no greater than one-half meter. It should be appreciated, however, that it is not necessary that the POM grid shape match the IOM grid shape. It should also be appreciated that the overall POM grid size is preferably limited to physically achievable states (i.e. the POM grid should not be defined to contain numerous extraneous cells that would always have a zero probability of occupancy.

It should, however, be understood that IOM grids and POM grids are not limited to any particular type, size or shape (e.g. the grids as wells as the cells which make up the grids need not have a square or a rectangular shape).

It should also be appreciated that a POM is but one specific example of a more general object occupancy map (OOM) and that the general concepts and techniques described herein are not limited to use with a POM.

Accordingly, those of ordinary skill in the art will appreciate that the description and processing taking place on pedestrians could equally be taking place on other objects and that portions (either partial or entire portions) of images, grids and cells may be provided having square, rectangular, triangular, polygonal, circular, or elliptical shape of any size. Likewise, the particular field in which the processing systems and techniques described herein may be used includes, but is not limited to, the general area of safety applications, including computerized safety applications and in particular to vehicle safety applications and even more particularly to pedestrian warning and/or pedestrian safety applications.

Referring now to FIG. 1, an image 12 has an intersection occupancy map (IOM) grid 10 disposed thereover. In the exemplary embodiment of FIG. 1, image 12 corresponds to a portion of a geographic location or region, here corresponding to a portion of a city covering one or more city blocks. It should be appreciated that IOM grid 10 is positioned and configured relative to a geographic region specific roadway (i.e. a specific longitude and latitude). As mentioned above the image is desired for visual clarity but not required for the utility of the PWS or any other application. The systems would work equally as well if the IOM grid was not specifically aligned with an image of the primary roadway of interest. Thus, while image 12 represents one or more city blocks, in the exemplary embodiment of FIG. 1, IOM grid 10 is disposed over image 12 with respect to a specific roadway such that IOM grid 10 has a desired orientation with respect to the specific roadway.

It should also be appreciated that, in an effort to promote clarity in explaining the concepts described herein, reference is sometimes made herein to an image 12 or an IOM grid 10 having a particular size or shape or to an IOM grid having a particular grid resolution (i.e. the number of grid elements per unit of distance). It should, however, be appreciated that image 12 and/or IOM grid 10 may be provided having any size or shape or any level of grid resolution. The particular size, shape and/or grid resolution to be used for the image or IOM in any particular application will be selected in accordance with the needs of the particular application.

Figures 2A, 2B:
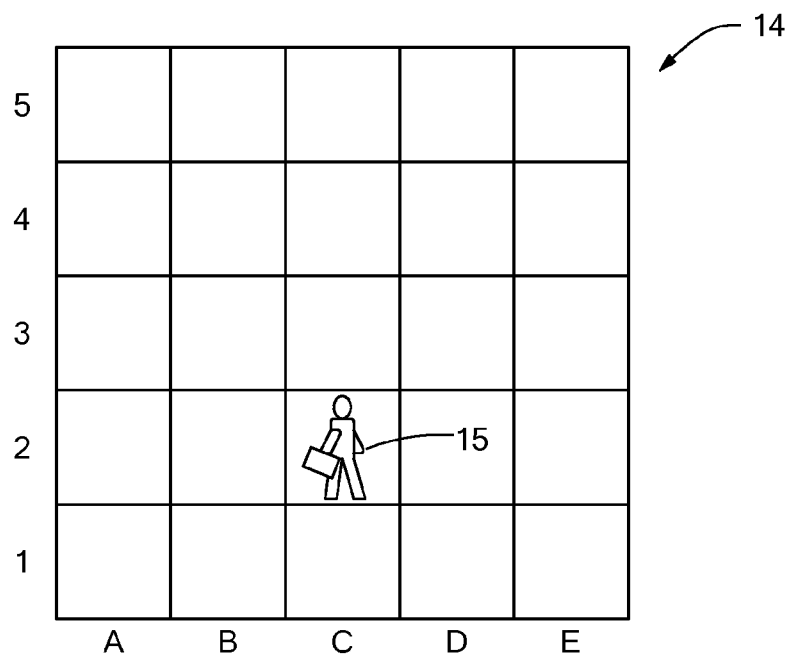
FIGS. 2A, 2B, 2C, and 2D are a series of pedestrian occupancy maps (POMs)

Referring now to FIG. 2A a "pedestrian occupancy map" (POM) 14 is utilized to populate an LAA given data parameters (both pedestrian and non-pedestrian data parameters) including, but not limited to pedestrian (or other object) position, speed, direction, signal phase and timing of traffic lights, presence and proximity of vehicle (e.g. cars in a road intersection), time of day, temperature and other weather related factors (e.g. including but not limited to possibility or existence of precipitation, wind and rain).

As shown in FIG. 2A, a current pedestrian position 15 is identified on POM 14. Stated differently, the position 15 of a pedestrian at a time $t=t_0$ is identified on the POM 14. The POM can be thought of as a "mini grid" (or sometimes referred to as a "mini-LAA") here having the current pedestrian (or object) position 15 as its origin (or reference location) as shown in FIG. 2A.

The POM is overlaid onto the IOM at a pedestrian's current position and, in preferred embodiments, the pedestrian location (e.g. a latitude and a longitude) defines the origin of the POM. The particular size, shape and/or grid resolution to be used for the POM in any particular application will be selected in accordance with the needs of the particular application. A POM is sometimes referred to herein as a current-time POM if it shows the current position of a pedestrian. For example, POM 14 shows the current position of pedestrian 15 at time t=0 and thus POM 14 may be referred to as a current-time POM 14.

It should be appreciated that a system may concurrently utilize a plurality of POMs and that each POM may be different and dependent upon any number of parameters related to the pedestrian or object being modeled, including but not limited to positional location, speed, direction, size, etc. Each POM may further be different and dependent upon any number of parameters not related to the pedestrian or object being modeled, including but not limited to signal phase and timing of traffic lights, presence and proximity of vehicle (e.g. cars in a road intersection), time of day, temperature and other weather related factors, etc. It should also be appreciated that a collection of POMs may be constructed and available for use with the methods described herein, with an individually selected-POM identified by performing a "look-up" or other procedure to determine the best/correct POM representation for a specific pedestrian or actor under specific conditions.

As will be described in detail below, for each POM chosen to model the current or future probable location(s) of a subject pedestrian or actor, the probability distribution of the individual POM is "overlaid onto" and added to the existing LAA, such as an IOM. As will be described in detail below, for the practical implementations, two distinct classes of POM have been identified.

Referring now to FIG. 2B, a current-time POM 20 is shown for an LAA defined to contain probabilities of occupancy. Thus, the current-time POM is represented in FIG. 2B as a grid or array of numbers with each number corresponding to a probability as to the location of the pedestrian.

Since POM 20 in FIG. 2B represents a current time ($t_0$), there is a 100% chance (or 100% probability) that the pedestrian "is where he is" at the current time ($t_0$), and 0% chance that he is anywhere else. Thus, in POM 20 of FIG. 2B, the cell located at the intersection of row 2 and column c (herein denoted "cell 2C" and corresponding to the cell in which the pedestrian is located, contains a value of 1.0. This indicates that there is a 100% chance that the pedestrian is located in cell 2C at time $t_0$. The remaining cells each contain a value of 0.0 indicating that there is a 0% chance that the pedestrian is in those cells at time $t_0$.

Because there exists at least some uncertainty as to the pedestrian location at some future time ($t_n$), the probabilities in any future POM (i.e. a POM predicting pedestrian location at a future point in time) assume some distribution over the POM cells which totals one hundred percent (100%).

Figure 2C:
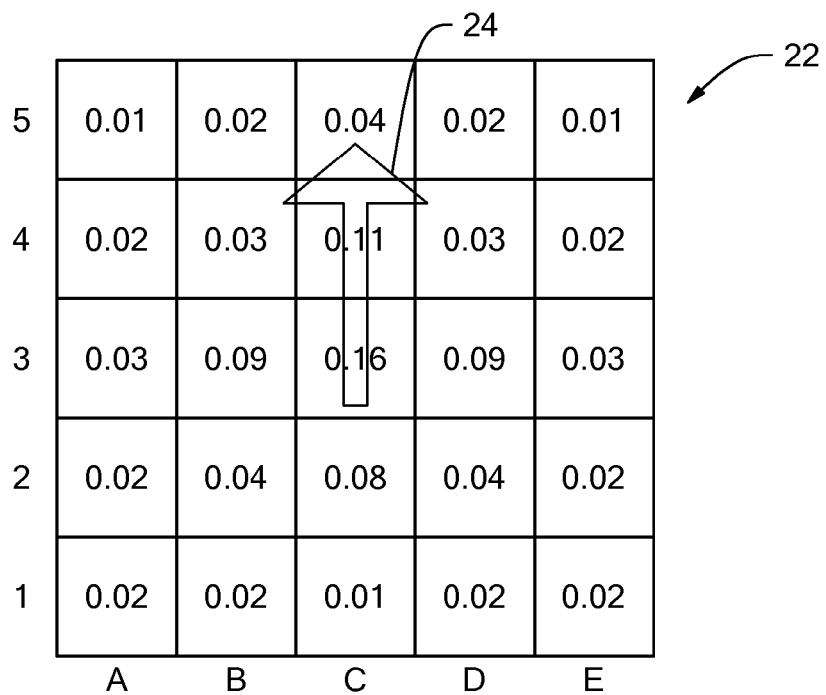

Thus, referring now to FIG. 2C, a future POM 22 (i.e. a POM for where the pedestrian 15 (FIG. 2A) will be at some future time ($t_n$)) contains a plurality of probability values. The distribution of values over the POM cells totals one hundred percent (100%). It should be noted that in this exemplary embodiment, the pedestrian/object is in motion and thus the POM is also direction-specific as indicated by an arrow labeled with reference numeral 24. The direction is derived from successive position observations over time. Most simply, it is the direction from the last observed position to the current $t_0$ position, but it may be filtered or smoothed for continuity. Other techniques may, of course, also be used to derive a direction.

In accordance with the concepts described herein, the system/techniques described herein identify two (2) distinct classes of POM. One class of POM is referred to as a so-called "cell POM" or "CPOM" (as shown in FIG. 2C), and another class of POM is referred to as a so-called "pin POM" or "PPOM" (as shown in FIG. 2D).

Figure 2D:
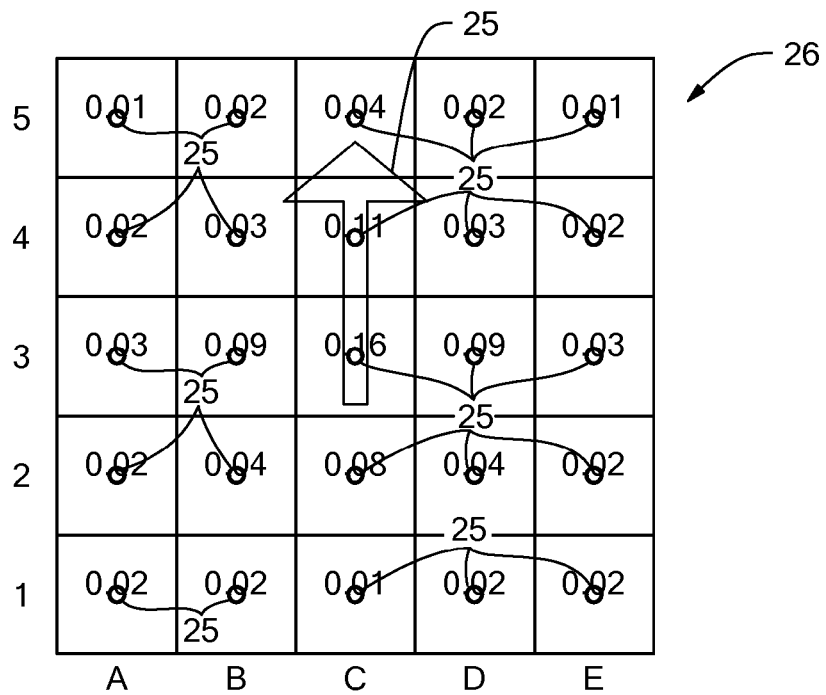

Briefly, a PPOM is formed by assuming that the probabilities contained in the POM occur at some finite number of distinct, infinitesimally small points ("pins") and denoted 25 in FIG. 2D. Each pin 25 is defined to be a specific distance and relative bearing from the POM's reference position (or "origin") and reference heading. Although not required, pins 25 are shown as being located in the center of each cell. This serves as a simplifying assumption for the simpler pin-POM method as opposed to the more complex cell-POM method.

A CPOM is formed by assuming that the probabilities contained in the POM occur within some finite number of distinct, rectangular or other convex polygon calls/areas, each defined to be a specific size, orientation, distance and bearing from the POM's reference position and reference heading.

Different techniques are used to assign probabilities to an LAA depending upon whether a pin POM or a cell POM is used. One technique for assigning probabilities to an LAA using a pin POM is described below in conjunction with FIGS. 4 and 5 and one technique for assigning probabilities to an LAA using a cell POM is described below in conjunction with FIGS. 6-9. The IOM cell to POM cell size is one factor to consider in deciding whether to use a PPOM or a CPOM technique at any particular time or in any particular application and false alarm rate is a factor to consider in selecting IOM cell size. In general, it is desirable to map a POM proportionally into the LAA and examples are described herein. It should be appreciated that in practical systems, typically the PPOM/CPOM choice may drive the IOM/POM cell size selections rather than the other way around. The CPOM is more accurate, but the PPOM is simpler and more computationally efficient.

Figure 3:
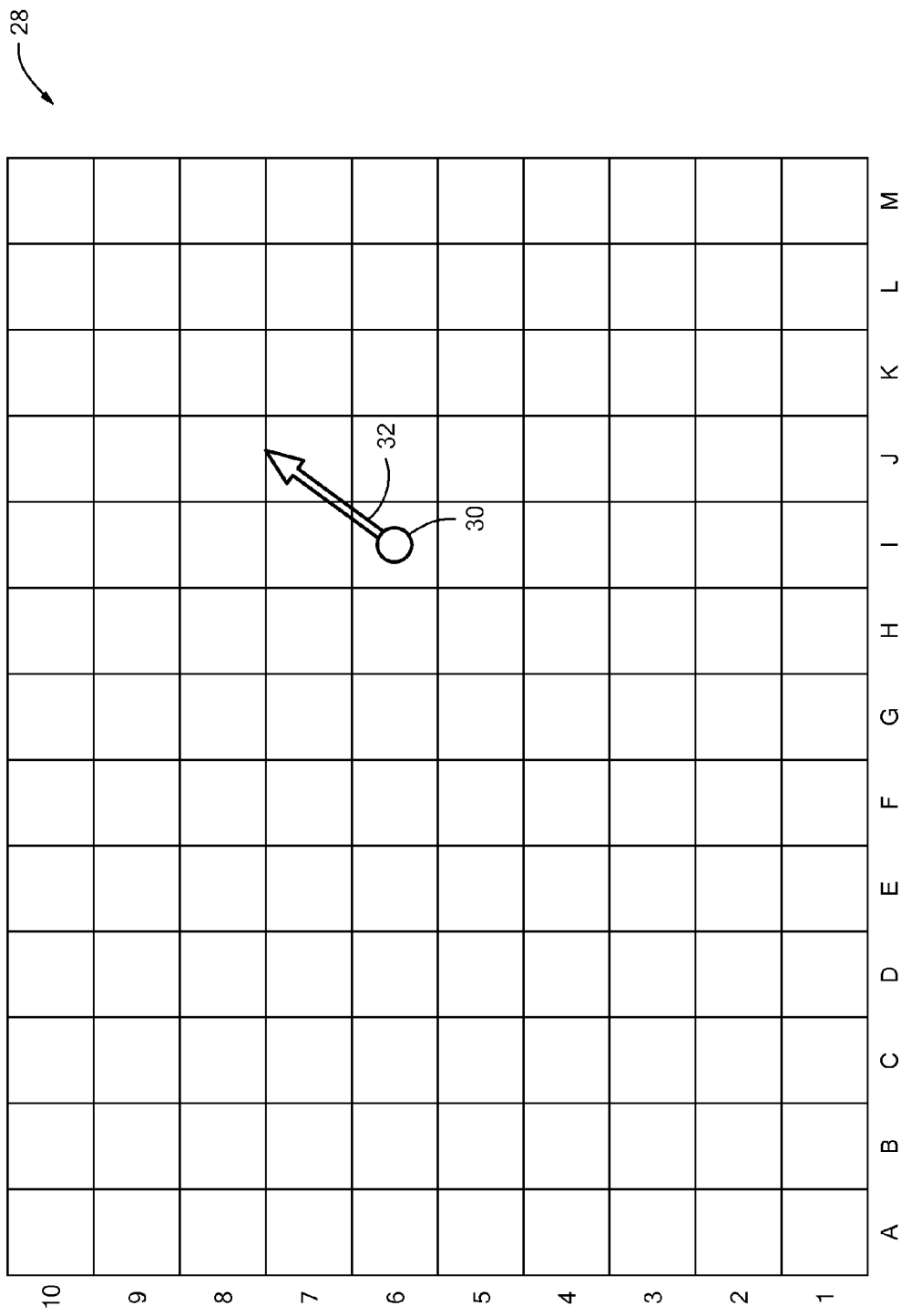
FIG. 3 is a pedestrian location projected onto a local area abstraction (LAA)

Referring now to FIG. 3, an LAA 28 having a pedestrian location and direction marked thereon (as indicated, respectively, by the dot designated by reference numeral 30 and the arrow as indicated by reference numeral 32) is used in determining the probability of the pedestrian location at a future point in time. Given pedestrian or object position 30 and direction 32 within LAA 28, the techniques described herein can be used for mapping data from either type of POM (i.e. either a cell POM or a pin POM) onto the LAA.

Figure 4:
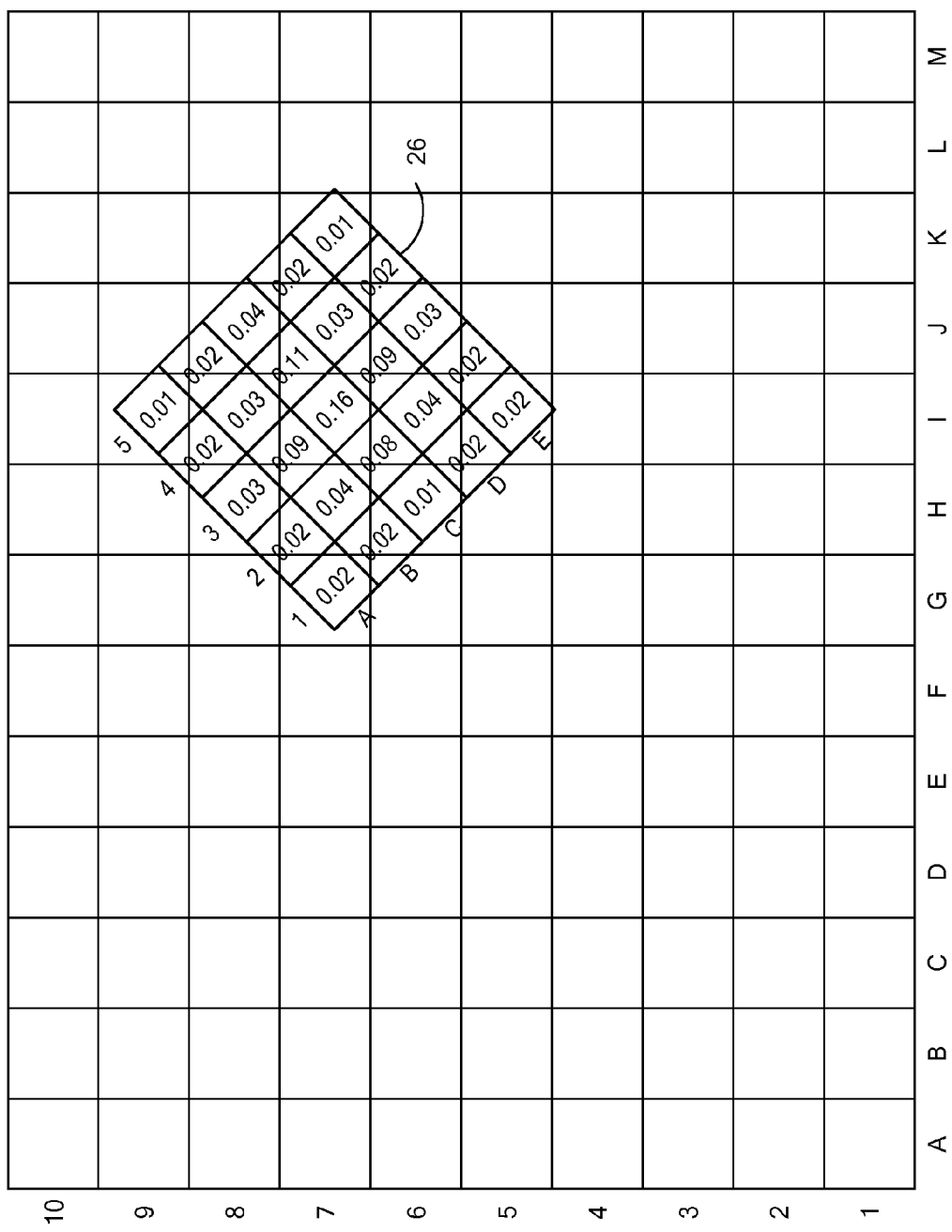
FIG. 4 is a POM overlayed on an LAA.
Figure 5:
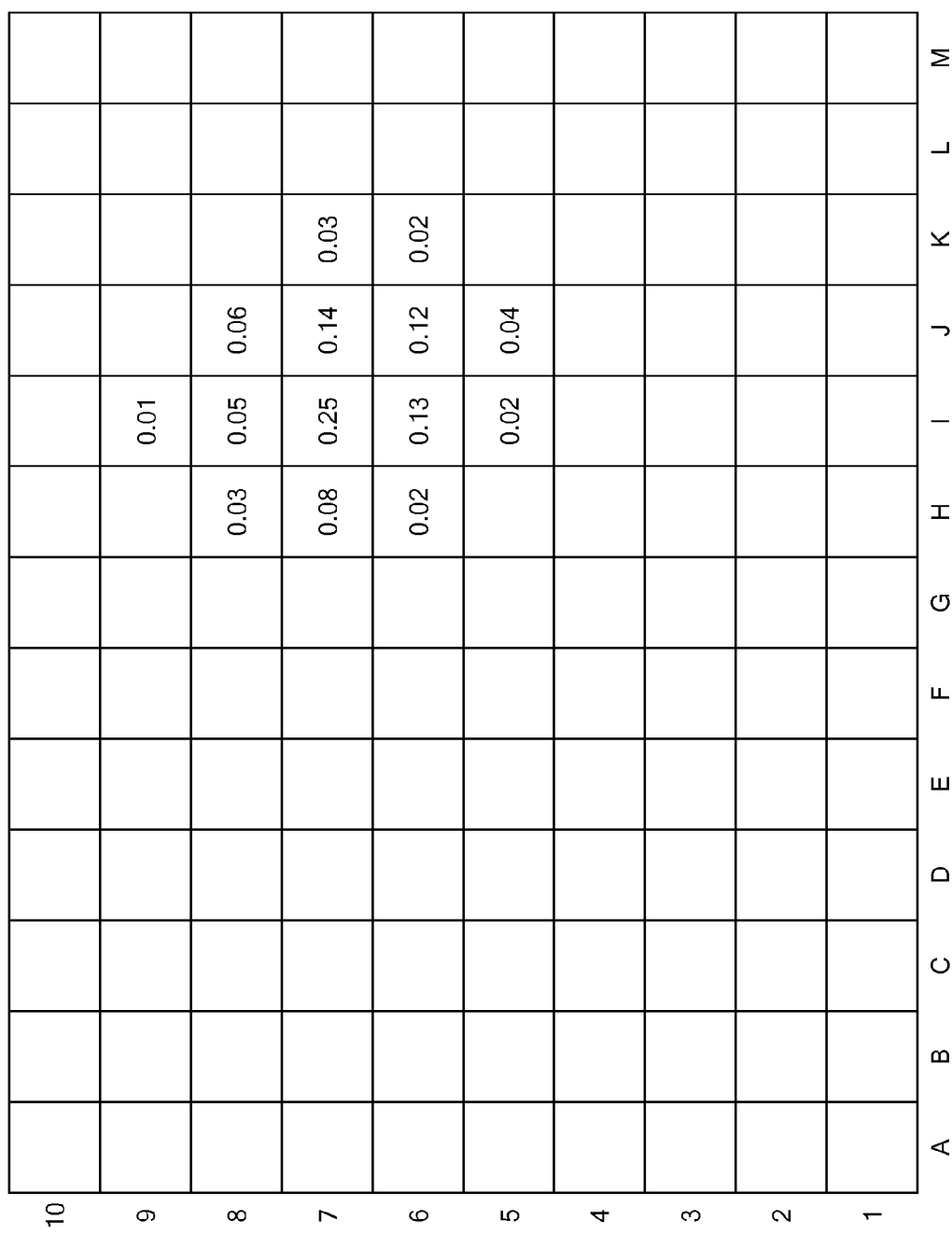
FIG. 5 is a plurality of probabilities mapped onto an LAA.

Referring now to FIG. 4, mapping pin POM 26 (FIG. 2D) onto pedestrian location 30 (FIG. 3) yields the overlay pictured in FIG. 4. The POM probability at each "pin" location (as indicated by the dot 25 in the center of each cell) is added to the underlying LAA cell probability of being occupied (that is, each LAA cell probability is the sum of all the pin probabilities overlaying that LAA cell—we do show the sums in FIG. 5). For a given time $t_n$, all LAA probabilities are initialized to zero (0) and then all observed pedestrians/objects are processed, with multiple pedestrians/objects potentially contributing to any LAA cell probability at a future time (i.e. there's a probability that two people may end up in the same place). The simplicity of the pin POM approach is that each probability in the POM maps entirely and exactly into one LAA cell. Thus, using this technique (i.e. mapping the probability in each POM cell entirely and exactly into one LAA cell), the resulting LAA probability distribution for the example pedestrian illustrated in FIG. 2A is shown in FIG. 5.

Thus, in the case where a single "pin" (i.e. the center of one cell in POM 26) falls within a single cell of LAA 28 (FIG. 5), the probability of the POM cell is assigned to the LAA cell. For example, as can be seen in FIG. 4, the center of POM cell 1D falls within cell 5I of LAA 28. Thus, with reference now to FIG. 5, LAA cell 5I has a value of 0.02 which equals the value of POM cell 1D (this assumes that the initial probability of LAA cell SI being occupied was zero).

It should, however, be noted that in the case where two "pins" (i.e. the centers of two cells in POM 26) fall within the same LAA cell, the probabilities are added and the sum is value associated with the LAA cell. For example, as can be seen in FIG. 4, the centers of cells 1E and 2E in POM 26 both fall within cell 5J of LAA 28. Thus, with reference now to FIG. 5, LAA cell 5J has a value of 0.04 which is determined by adding the values of cells 1E and 2E from POM 26 and assigning the sum to cell 5J of LAA 28 (as above, this assumes that the initial probability of LAA cell 5J being occupied was zero).

Figure 6:
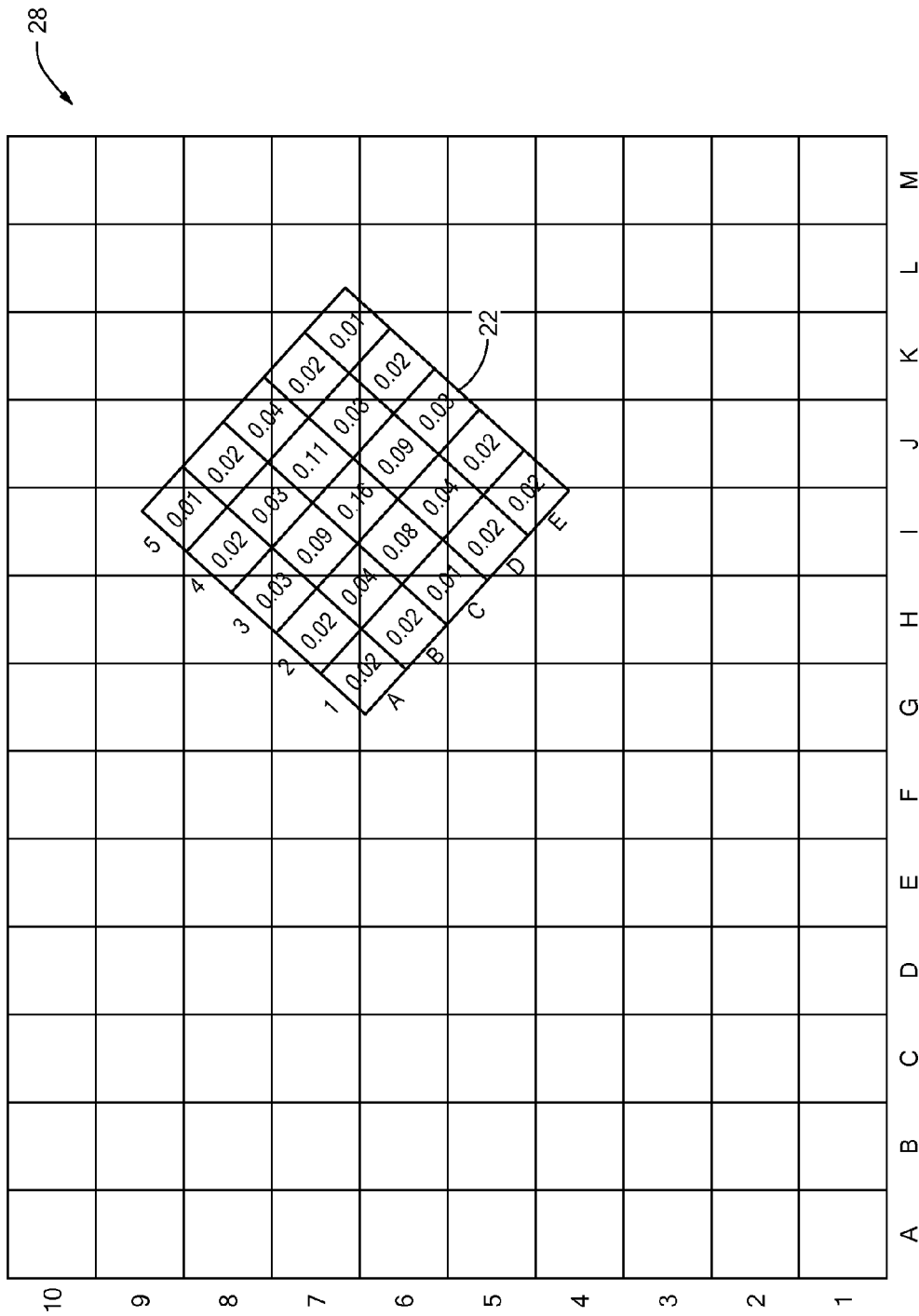
FIGS. 6 and 7 is a POM overlayed on an LAA.

Referring now to FIG. 6, mapping cell POM 22 (aka CPOM 22) onto the pedestrian location 30 (FIG. 3) yields the overlay pictured in FIG. 6. Because the probability for each cell in the POM belongs to the entire cell area (not just a single "pin" point), the probability for any given cell in POM 22 may map into multiple cells of LAA 28, depending upon the areas of overlap.

Figure 7:
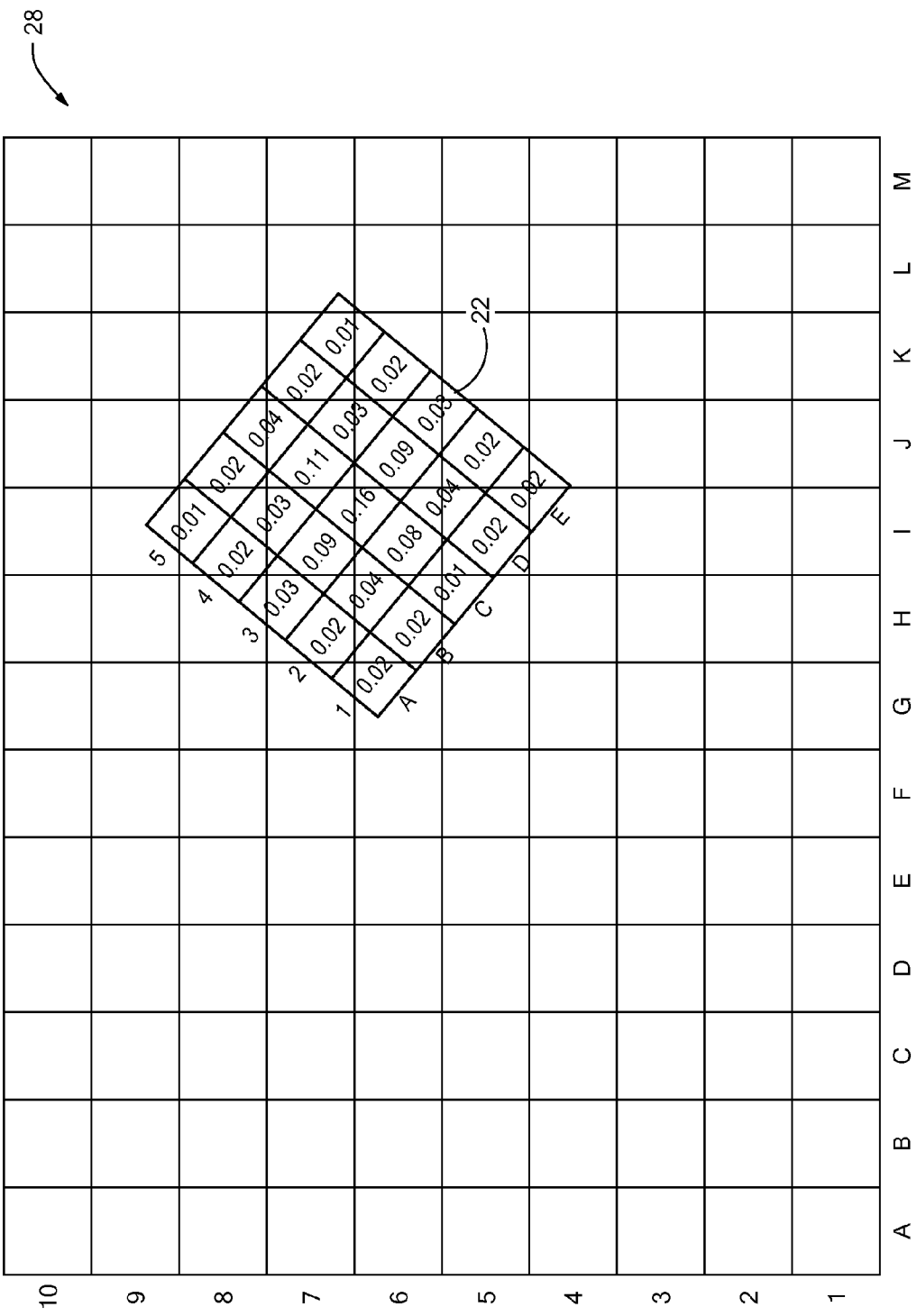

Referring now to FIG. 7, consider the CPOM cell 4C containing the probability value of 0.11. POM cell 4C extends over portions of LAA cells 7I, 7J and 8J. Thus, the probability value of POM cell 4C must be distributed over three LAA cells (i.e. cells 7I, 7J and 8J).

Figure 8:
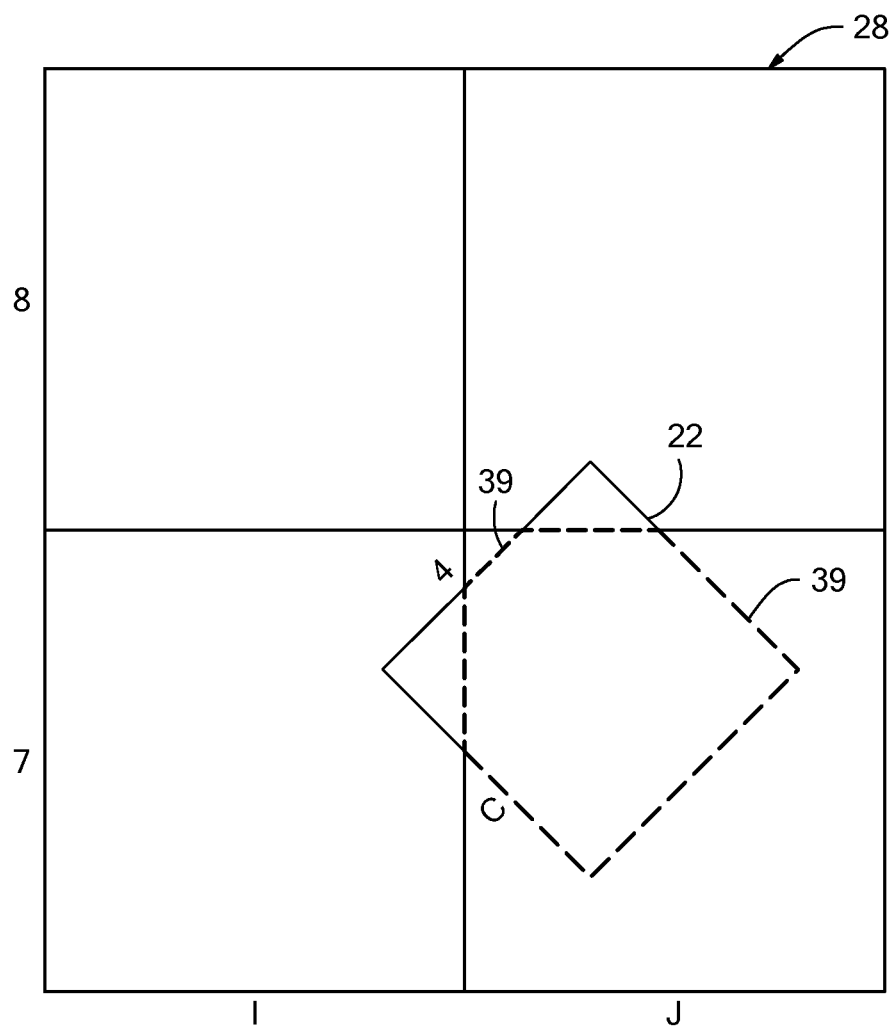
FIG. 8 is an enlarged view of a portion of a POM overlayed on a portion of an LAA.

Referring now to FIG. 8, cell 4C from CPOM 22 is shown disposed over cells 7I, 7J and 8J of LAA 28. To accommodate the overlap, the 0.11 probability value assigned to POM cell 4C is proportionally distributed to LAA cells 7I, 7J and 8J. The portion of the 0.11 probability distributed to the LAA cell 7J is equal to the ratio of the overlap area of the POM cell onto the LAA cell (represented by region outlined by dashed line 39 in FIG. 8) divided by the entire area of CPOM cell 4C. For a cell having a rectangular or square shape, the area of each cell, whether it be a POM cell or an LAA cell, is simply the product of the cell height and cell width. In practical systems, LAA cells having a square shape with height and width equal to 1 m (so LAA cell area equal to 1 meter square) have been used and POM cells having a square shape with height and width equal to 0.5 m (so POM cell area equal to 0.25 square meters). The overlap areas are determined by the process described below. The cells may, of course, be measured in any units. Similar computations are made for LAA cells 7I and 8J.

Figure 9:
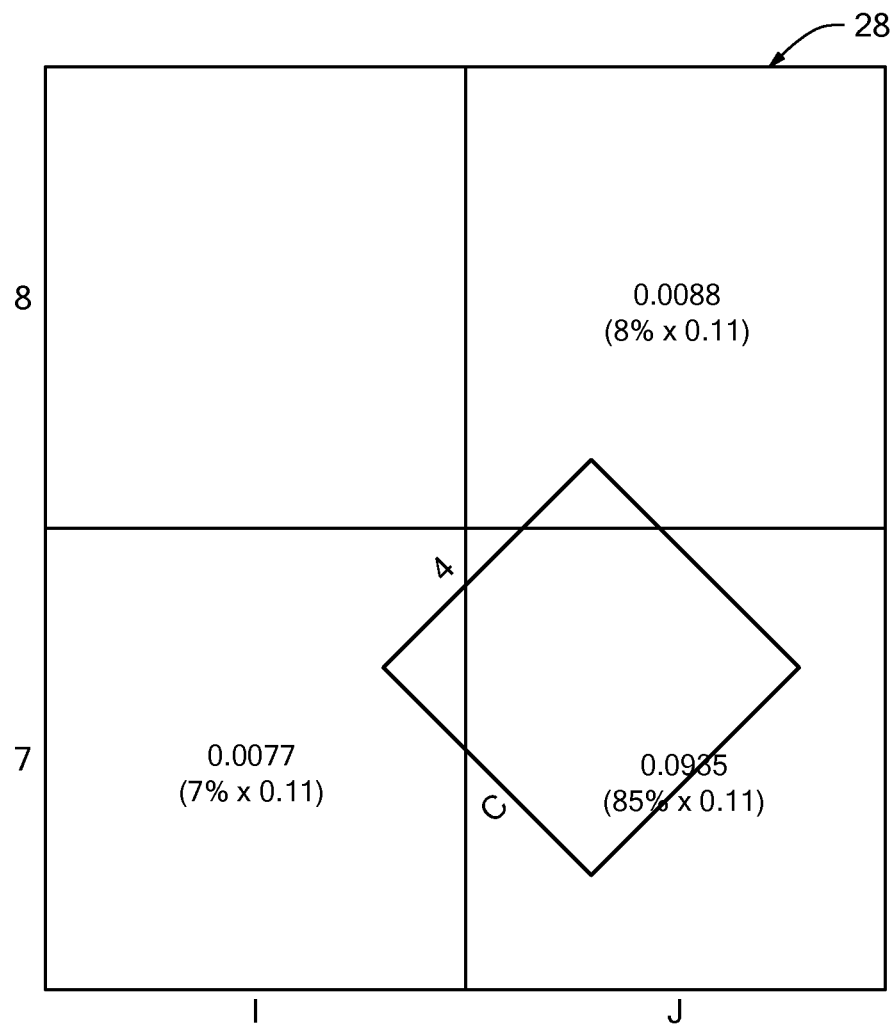
FIG. 9 is a plurality of probabilities mapped onto an LAA.

A resulting distribution of the probability of POM cell 4C to LAA cells 7I, 7J, 8J is illustrated in FIG. 9.

One technique for determining the area of the "overlap polygon" (e.g. the region represented by dashed line 39 in FIG. 8) is described below.

As discussed above, the probability assigned to each cell/area of the CPOM is distributed proportionately to the LAA cell(s)/area(s) it overlaps. For the simple/preferred case in which both the POM cells/areas and the LAA cells/areas are convex polygons, the area of overlap between any two convex polygons defines a convex polygon.

The below steps are repeated for each POM convex polygon cell/area.

Each of the n points defining the subject POM convex polygon and m points defining the subject LAA convex polygon are added to a list of points, L.

For each of n sides of the POM convex polygon and m sides of the LAA convex polygon, simple algebra is applied to compute the intersection of the POM and LAA (if any). If the two sides intersect, the point of intersection is added to the list of points, L.

For each point in the list of points L, checks are performed to determine if the point is on-or-within the POM cell area and/or on-or-within the LAA cell/area, using widely accepted algorithms. If the point is not on-or-within BOTH the POM and LAA cells/areas, it is removed from the list of points, L. At the conclusion of this operation, the list of points L contains only points that are on the perimeter of the area of overlap between the POM and LAA; the points being in no particular order.

If the number of points in list L is 0, 1, or 2, then the area of overlap=0.

If the number of points in list L is greater than 2 then the algorithm processing continues with the following steps to place the points in list L into a "clockwise order".

The first 2 points from list L are copied into clockwise list, C, in positions #1 and #2.

For each of the p remaining points in list L, the point is "inserted" into successive trial slots in list C (before, between and following the other points in list C) and the resulting list is checked to see if it is counterclockwise at any point, using widely accepted algorithms. If the resulting list is found not to be counterclockwise at any point, then the test point has been properly inserted into list C and the next point in list L is processed. If the resulting list is found to be counterclockwise at any point then the test point has not been properly inserted into list C and the next candidate slot is tried for the test point. A correct insertion into list C will be found for every point in list L.

The previous step is repeated until all points in list L have been inserted into list C. The resulting final list C is a list of points defining the area of overlap between the convex POM polygon and convex LAA polygon, sorted in clockwise order.

Using widely accepted algorithms, the area of overlap defined by the clockwise list of points C and the area of the subject convex POM cell are calculated.

The probability of the convex LAA cell/area is increased by the probability of the subject convex POM cell/area times the ratio of the overlap area defined by list C divided by the area of the subject convex POM polygon.

Figure 10:
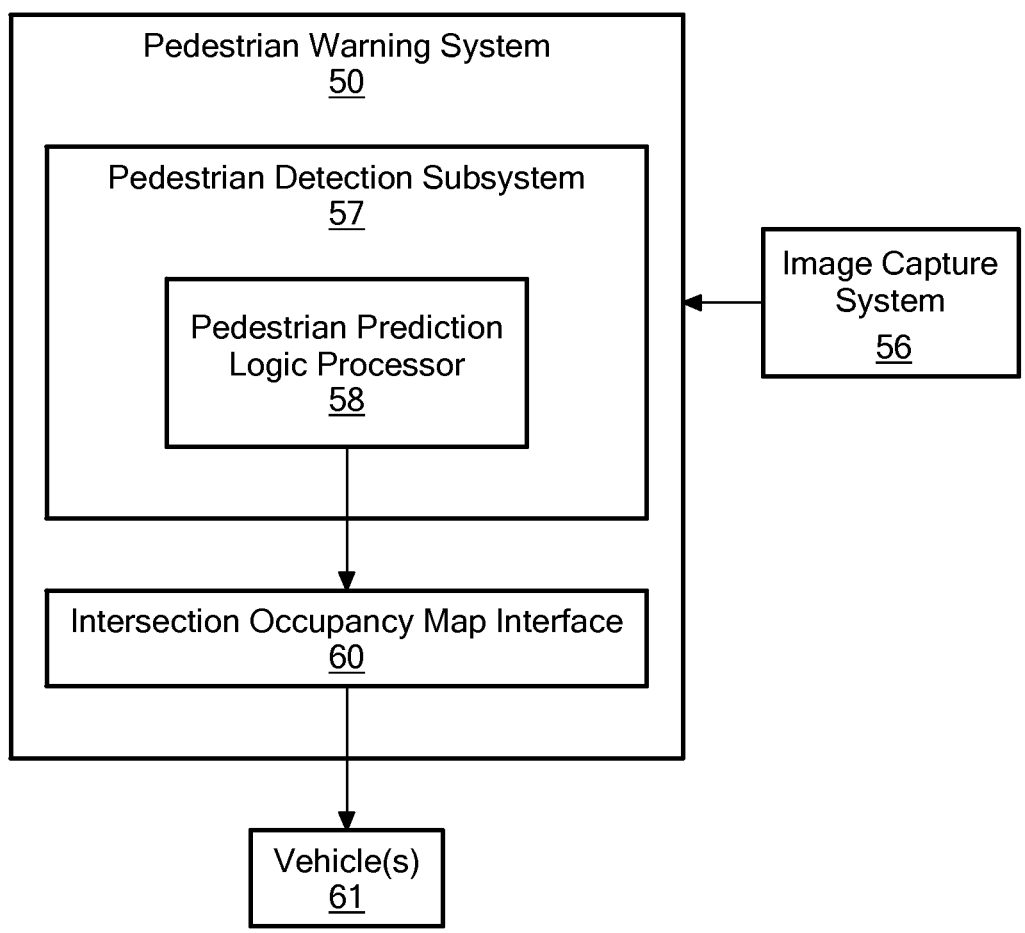
FIG. 10 is a block diagram of a pedestrian warning system operating in accordance with the concepts and techniques described in conjunction with FIGS. 1-9.

Referring now to FIG. 10 a pedestrian warning system 50 receives information from one or more information sources 56 such as an image capture system (e.g. a camera system which may include for example a digital camera or a camera connected to a frame grabber, a video system which, may include a video camera for example, and any other means known to those of ordinary skill in the art for capturing or otherwise obtaining images and transmitting or otherwise making image data available to a pedestrian warning system). For example, information source 56 may include a network connection which allows the system to receive image data from a global information network (e.g., an internet) or on intranet or any other type of local or global network. Thus system 50 can receive real time or "live" camera images instead of retrieving images from a database or other storage device. Alternatively still images or other information may be fed to system 50 via other means well known to those of ordinary skill in the art.

Pedestrian warning system 50 includes a pedestrian detection subsystem system 57. Regardless of how information is provided to system 50, pedestrian detection subsystem 57 receives at least some of the information and provides information to a pedestrian logic processor 55. Pedestrian logic processor 58 determines locations and possible future locations of one or more pedestrians within a region of interest. Pedestrian logic processor 58 determines such information in accordance with concepts and techniques described herein and provides the information to an intersection occupancy map interface 80. Desired information and/or signals and/or, warnings or the like are then provided and in some cases the information and/or signals and/or, warnings are provided to both pedestrians and/or to one or more vehicles 61 in proximity with the pedestrians.

In one embodiment, a series of POMs/IOMs corresponding to different time intervals (e.g. two seconds, four seconds, six seconds, eight seconds—so four maps) are generated. Thus, if a map at t+8 (i.e., a map at 8 seconds into the future) is examined, it will reveal the probability of where pedestrians will be in eight seconds.

It should be appreciated that it is possible to have a vast library of POMs (i.e. pre-stored POMs having probability values already stored therein with the probability values being computed for specific factors) or it is possible to compute the POM probability values in real time.

Figure 11:
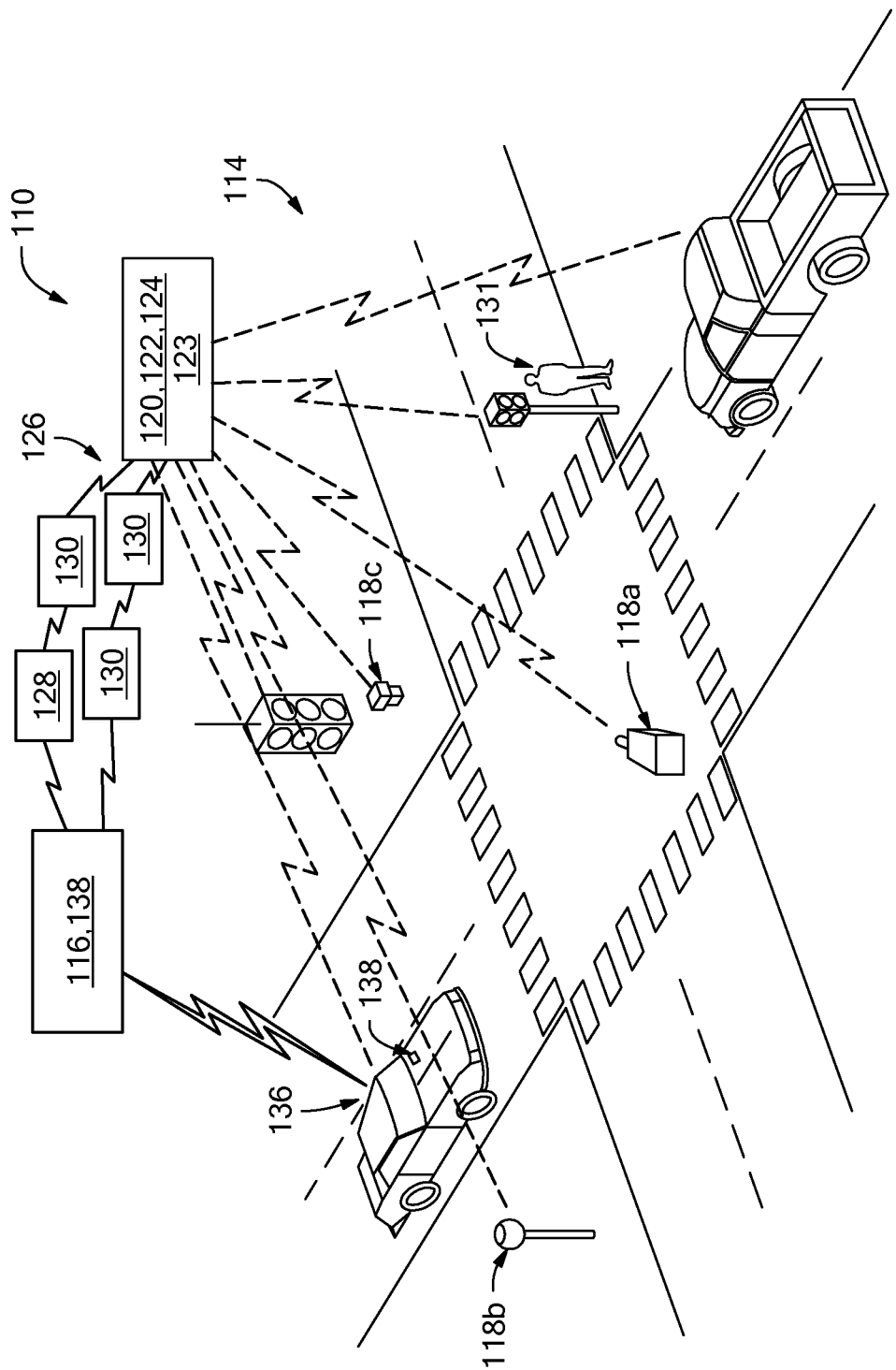
FIG. 11 is an illustration of an object detection system which includes a pedestrian warning system.

Referring now to FIG. 11, an object detection system 114 includes a pedestrian warning system which may be the same as or similar to pedestrian warning system 50 described above in conjunction with FIG. 10 as well as a plurality of sensors 118 configured to provide coverage of a predetermined area. The sensors 118 are also configured to detect movement of objects within the predetermined area. For example, the object detection system 114 may include a plurality of cameras 118a, a global positioning system 118b, and other sensors such as radar 118c and sonar. Each sensor 118 is in communication with the object detection system 114.

The object detection system 114 includes a processing unit 120 (e.g. a computer processing unit), a path predicting circuit 122 and a pedestrian warning system 123. Sensors may detect both stationary objects and moving objects as well as objects such as pedestrian 131 which may be stationary at one instant in time and moving at a later point in time. If a pedestrian's position, speed and direction are known, then as described above a probability of a future position of pedestrian 131 may be determined by a pedestrian logic processor (e.g. such as pedestrian logic processor 58 described above in conjunction with FIG. 10). In one embodiment, the pedestrian logic processor utilizes the factors/information provided thereto to access a storage device or system (e.g. a database) and look up a probability of the pedestrian's next position using the current factors/information. Processing unit 120 is operable to collect and process sensor information. For instance, processing unit 120 may filter corrupt or abnormal sensor information and prevent such information from being transmitted to the collision processing circuit 116.

Path predicting circuit 122 processes information gathered by the sensors 118 so as to predict the path of the detected objects within the predetermined area. Object detection system 114 may further include a plotting circuit 124. Plotting circuit 124 plots the predicted location of the detected objects. The object detection system 114 may be housed locally within the predetermined area or may be remote.

Processing unit 120 may also be housed locally within the object detection system 114 so as to receive the information from sensors 118 on site. The information from the sensors 118 may be processed using the path predicting circuit 122 and may be further plotted onto a map using the plotting circuit 124. Alternatively, the object detection system 14 may be remote from the predetermined area. As described above, the camera 118a and other sensors 118 may be used to provide coverage for a predetermined area and to detect objects in the area. These sensors 118 are in communication with the remotely located object detection system 114. The object detection system 114 processes the sensor information and transmits the processed information to the collision processing circuit 116 for processing.

The data transferring system 110 includes at least one cycle of data 126. Each cycle of data 126 may include a transmission of static information 128 relating to the environment of a predetermined area, and subsequent transmissions of dynamic information 130 relating to the movement of detected objects such as pedestrians 131 within the predetermined area. In one embodiment, the transmission of static information includes a map definition 128, and the subsequent transmissions include a series of overlays 130.

The map definition 128 includes static information relating to the predetermined area of the object detection system 114, and a grid system 132 plotted onto the predetermined area. The grid system 132 is defined by a plurality of grid cells 134. The map definition 128 is directed towards providing comprehensive environmental information concerning the predetermined area that does not change frequently. For example, the map definition 128 may include information relating to the location and orientation of the infrastructure located within the predetermined area; the types of traffic signs and signals such as crosswalk signs, yield signs, and the like; building height, elevation, orientation as well as other environmental data. The object detection system 114 may generate a map definition 128 using collected sensor information or a map definition 128 may be provided to the object detection system 114.

The data transferring system 110 further includes a series of overlays 130. Each of the series of overlays 130 includes a grid system 132. Preferably, the grid system 132 is identical to the grid system 132 provided on the map definition 128 so as to reduce processing time associated with correlating the two grid systems 132. The grid system 132 is plotted over the predetermined area covered by the object detection system 114. The overlays 130 include dynamic information relating to detected objects within the predetermined range. Specifically, the plotting circuit 124 plots the predicted location of each of the detected objects onto the grid system 132 of each of the series of overlays 130.

The map definition 128 and the overlays 130 may include other information to provide static information relating to the environment of the predetermined area and dynamic information relating to the state of a detected object in a future. For instance the signal phase and timing of traffic lights (SPAT) may be sent to the object detection system 114 and utilized in generating both the map definition 128 and the series of overlays 130. SPAT information may be used to provide the map definition 128 with information relating to the operation of traffic signals within the predetermined area. SPAT information may also be used to predict the location of detected objects in the predetermined area. Specifically, SPAT information such as the timing of traffic lights may be used in a mathematical model to help predict the location of the detected objects.

The path predicting circuit 122 predicts the path of the detected objects which may include the path of the system vehicle 138. Any method of path prediction currently known and used in the art may be adaptable for use in the path predicting circuit 122. For instance, the path predicting circuit 122 may generate a path prediction by plotting the velocity and location of the detected object so as to create a kinematic vector of each detected object, including the system vehicle 138. In yet another example, the path predicting circuit 122 uses a statistical method or logical model for predicting the location of detected objects at a given time.

The data transferring system 110 transmits a cycle of data 126 to the collision processing circuit 116. The cycle of data 126 includes a first transmission of the map definition 128, and subsequent transmissions of the overlays 130. The map definition 128 is transmitted at an initial time $T_0$. The initial time of transmission may be when the system vehicle 138 enters into the predetermined area of the object detection system 114. In addition, other factors may trigger the initial time of transmission. For instance, the object detection system 114 may be programmed to preclude transmitting cycles of data 126 when there are no objects in the predetermined area other than the system vehicle 138. However, the object detection system 114 may transmit the map definition 128 at an initial time should the object detection system 114 detect another obstacle entering into the predetermined area.

Each overlay in the cycle of data 126 is plotted so as to identify the predicted location of a detected object at $T_{0+i*n}$, where "0" is the time at which the map definition 128 is transmitted, "i" is the interval by which path prediction is generated, and "n" is the number of overlays 130 generated in a cycle of data 126. For example, assume the data transferring system 110 is configured to provide path prediction at 0.2 second intervals after the initial time, and generates four overlays 130 in a cycle of data 126. The first overlay is plotted with the predicted location of detected objects at 0.2 seconds after the map definition 128 has been transmitted. The second overlay is plotted with the predicted location of detected objects at 0.4 seconds after the map definition 128 has been transmitted, and so on until four overlays 130 have been generated. The overlays 130 may be transmitted separately or bundled together with the map definition 128.

The configurable interval in which each of the series of overlays 130 is transmitted may be influenced by factors such as the speed at which the system vehicle 138 is operating, the number of detected objects within the predetermined area, and the like. For example, if the system vehicle 138 and the detected objects are traveling at a speed of less than twenty miles per hour, the interval by which the overlays 130 are generated may be greater than if the system vehicle 138 and detected object are traveling at a speed greater than twenty miles per hour.

In another example, the interval at which the overlays 130 are generated may be shortened even further if there are more than three detected objects within the predetermined area and at least one of those detected objects is within a predetermined distance to the system vehicle 138. Another factor that could affect the interval in which the overlays 130 are generated is the geographic size of the predetermined area of coverage. Thus, if the predetermined area of coverage is five hundred square feet, the overlays 130 may be generated at an interval of 0.2 seconds whereas if the predetermined area of coverage is one thousand square feet, the interval at which each of the overlays 130 is generated is 0.3 seconds. Likewise, the number of overlays 130 generated is also influenced by environmental factors. For instance, the number of overlays 130 desired may be influenced by the speed of the system vehicle 138 and the detected objects as well as the geographic size of the predetermined area of coverage.

This flexibility allows the data transferring system 110 to be tunable, meaning the data transferring system 110 can generate overlays 130 based upon the needs of the system vehicle 138. The needs of the system vehicle 138 may be influenced by factors such as the size of the predetermined area, the speed of the objects detected within the predetermined area, and the speed at which the system vehicle 138 is traveling. For instance, where the speed limit of the geographic location is thirty five miles per hour and the road is a two-lane road, it may be desirable to predict collisions for periods which occur three seconds after the system vehicle 138 has entered into the predetermined area. Thus, the frequency at which the overlays 130 are generated may be lesser than if the geographic area speed limit was fifty miles per hour. Likewise, the number of overlays 130 generated might be less in an area where the speed limit is thirty-five miles per hour as opposed to an area where the speed limit is fifty miles per hour.

It should be appreciated that in some embodiments, it may be preferable for fielded systems to be specifically configured for a given installation. In such cases, the system is provided with fixed intervals (vs. configurable or dynamically selected intervals) and fixed data rates (vs. variable data rates). However, some self-configuring may be done (e.g. adjustments/balancing of video and thermal sensor inputs).

After the cycle of data 126 is generated, the data transferring system 110 may then transmit the cycle of data 126 to a collision processing circuit 116. The data transferring system 110 may generate and transmit multiple cycles of data 126 to the collision processing circuit 116. The number of cycles of data 126 generated may be influenced by such factors as the presence of the system vehicle 138 within the predetermined area of coverage, thus ensuring that the system vehicle 138 is provided with a collision warning while in the predetermined area. After a collision processing circuit 16 has received the first cycle of data 126 from the object detection system 114, subsequent cycles of data 126 may be limited to just a transmission of overlays 130 so as to further reduce the size of data transfer. This is preferable since the map definition 128 of a predetermined area may not change significantly while the system vehicle is within the predetermined area. Accordingly, a subsequent cycle of data 126 may include a map definition 128 when the environmental information relating to the predetermined area of coverage of the object detection system 114 has changed.

It should be appreciated that when a vehicle enters into range of a PWS, a PWS map is needed. Thus, the system periodically broadcasts a map definition (e.g. every one second), while the IOM set is typically sent at a higher frequency (e.g. 5 times per second). The map definition also includes a version number. Use of a version number allows a receiver to not process the available data if they already have the definition.

The collision processing circuit 116 may be housed within the object detection system 114, the system vehicle 138, or offsite. The collision processing circuit 116 processes the cycle of data 126 to determine a probability of a collision. The collision processing circuit 116 is in communication with a warning system 136, and actuates the warning system 136 if the collision processing circuit 116 determines that the probability of collision exceeds a predetermined threshold value. It should be understood that multiple types of collisions of interest can be configured for detection by the system (e.g.

pedestrian-vehicle or vehicle-vehicle) and thus it is possible to have different threshold values for different types of collisions.

The warning system 136 may be housed in the system vehicle 138 or the object detection system 114. Any warning system 138 currently known and used in the art is adaptable for use herein, illustratively including a digital display mounted on the dashboard of a system vehicle 138, a light mounted to a post located in the predetermined area operable to flash when a potential collision exists, or a device such as a speaker operable to send an audible warning to people within the predetermined area.

Figure 12:
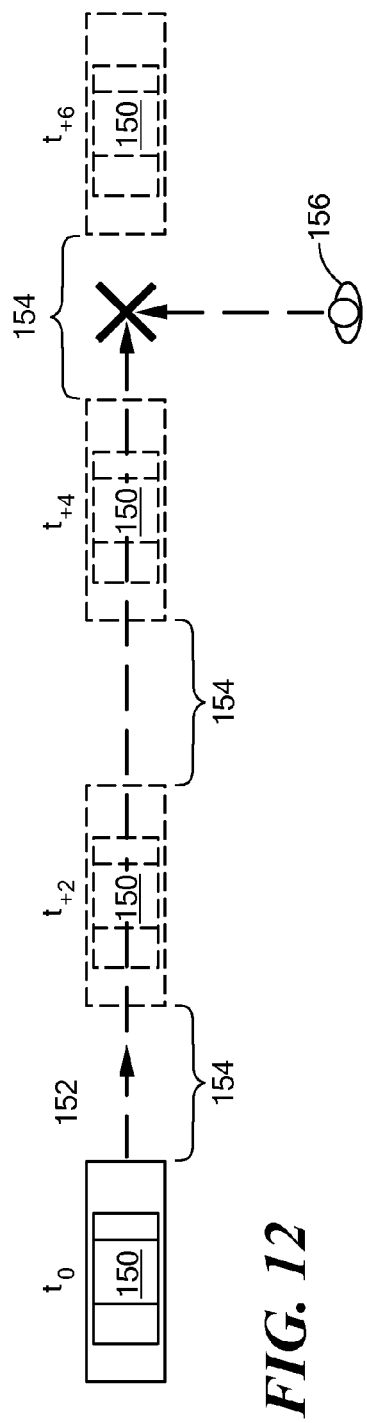
FIGS. 12-12B are a series of figures which illustrate track gapping.
Figure 12A:
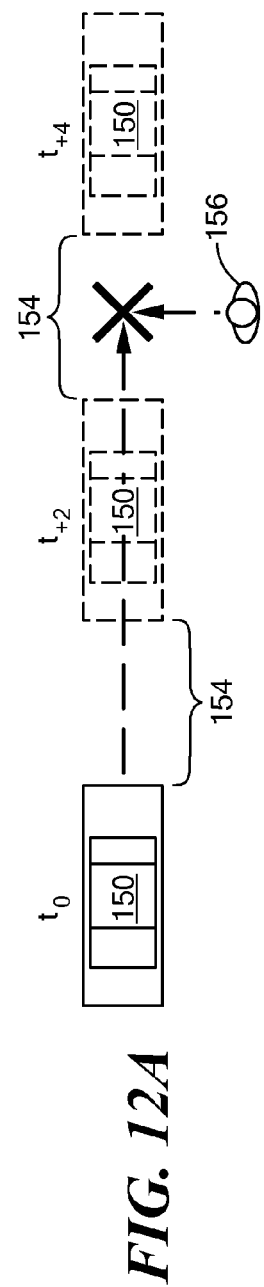
Figure 12B:
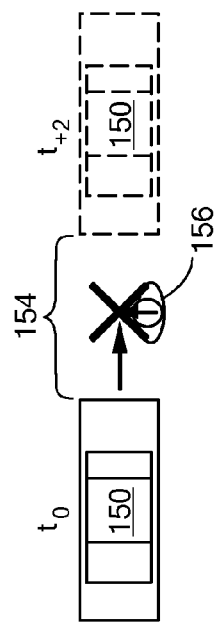

Referring now to FIGS. 12-12B in which like elements are provided having like reference designations throughout the several views, a vehicle which is five (5) meters long 150 is travelling in a direction indicated by reference numeral 152 at a speed of four and one-half (4.5) meters/sec. It should be appreciated that FIG. 12A represents a point in time which is two (2) seconds later than the time represented in FIG. 12 and that FIG. 12B represents a point in time which is two (2) seconds later than the time represented in FIG. 12A. In each of FIGS. 12-12B, time $t_0$ represents the present time for that particular figure.

In FIG. 12, the vehicle 150 is shown at a present position in time designated as $t_0$. FIG. 12 also shows vehicle 150 at three future points in time at two second intervals (with the future times denoted as $t_{+2}$, $t_{+4}$, $t_{+6}$). Since discrete time computations are used to compute the vehicle locations, a space or gap 154 exists between each of the time intervals $t_0$-$t_6$. Given the speed of travel and length of vehicle 150, the gap 154 which exists between each interval can be determined. Thus, in this particular example (i.e. a vehicle 150 which is five (5) meters long travelling at a speed of four and one-half (4.5) meters/sec), the gap 154 which exists between each two second interval is four (4) meters in length. Also, at this particular speed, the gaps 154 align. This gap alignment phenomenon is sometimes referred to as "track gapping." Thus, a "track gap" (or more simply a "gap") can be thought of as a space between where a vehicle location, for example, is computed at a present time (e.g. time $t_n$) and at some future point in time (e.g. at a time two seconds in the future denoted as time $t_{+2}$). If a pedestrian's predicted future path is positioned in the gap and the gaps align given the speed of the vehicle, then it may not be possible to precisely predict a collision between the car and the pedestrian. Using conventional techniques to determine the car speed and gap length, it is possible to assign an artificial length to the car so that gaps are eliminated. For example, assuming a car has an actual length of fifteen feet, if the gap is determined to be twenty feet given the speed of the vehicle, then by artificially (mathematically) expanding the length of the car from fifteen feet to thirty-five feet, the gap is eliminated.

Thus, as illustrated in FIG. 12B, in such a scenario, a pedestrian 156 in a gap 154 may not trigger a collision warning in a system which utilizes discrete time computations (e.g. traditional Kalman filtering methods).

The concepts and techniques described herein above, however, provide accurate solutions for multiple time-phased predictions.

The multi-time predictions provided via the concepts and techniques described herein in conjunction with FIGS. 1-11 can be chained together so as to eliminate the problem of "track gapping" experienced with discrete time solutions.

Figure 13A:
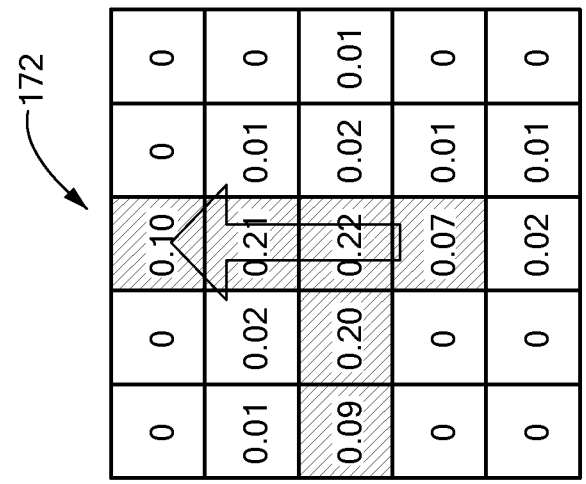
FIG. 13A is a POM for the scenario of FIG. 13.
Figure 13:
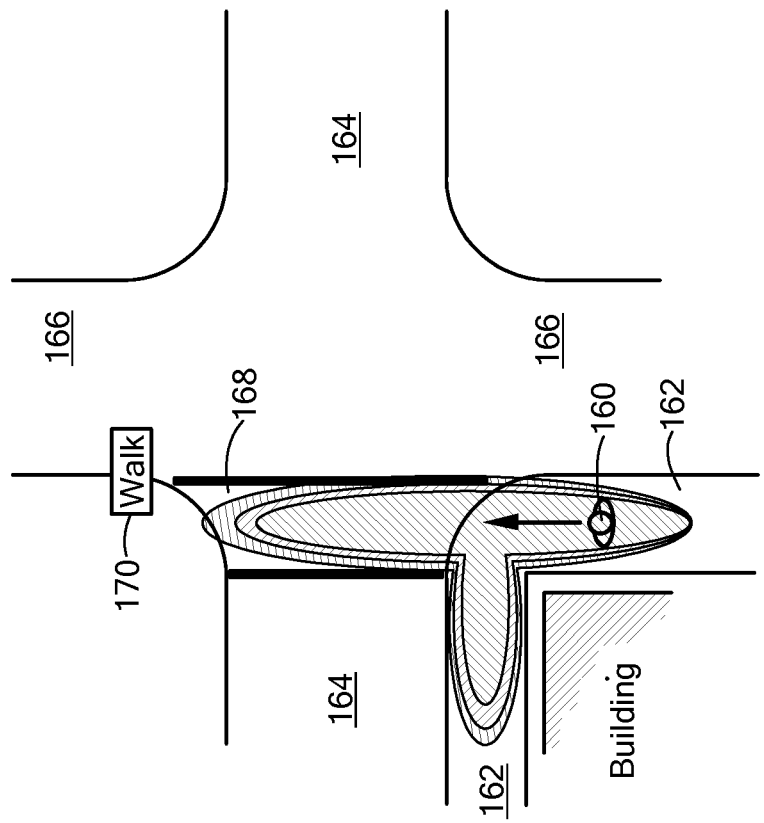
FIG. 13 is a diagrammatic view of a scenario in which a pedestrian moves toward a crosswalk.

Referring now to FIG. 13, a pedestrian 160 moving along a path 162 (e.g. a sidewalk) reaches an intersection of two streets 164, 166. Pedestrian 160 has the option of crossing street 164 (e.g. in a crosswalk 168) or turning left and staying on path 162. Significantly, a crosswalk sign 170 indicates to pedestrian 160 that it is safe to cross street 164 by travelling in cross-walk 168. Thus, in this scenario POM 172 shown in FIG. 13A, may apply.

Referring now to FIG. 13A, exemplary non-continuous POM distribution 172 indicates that the probability of pedestrian 160 moving toward crosswalk 168 is only slightly greater than the probability of pedestrian 160 following sidewalk 162, with only a very small likelihood that the pedestrian will stray off of these two primary paths.

Figure 13C:
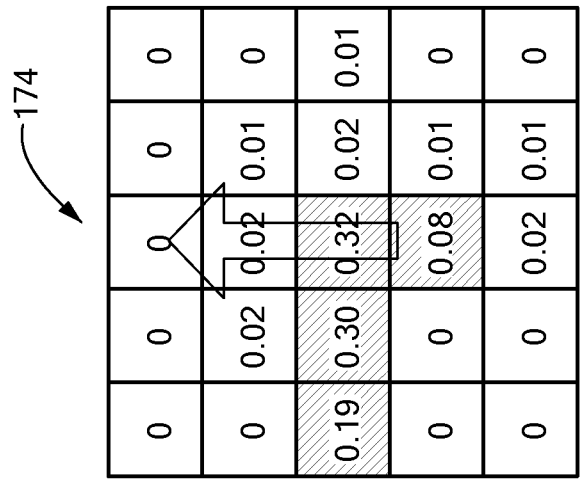
FIG. 13C is a POM for the scenario of FIG. 13B.
Figure 13B:
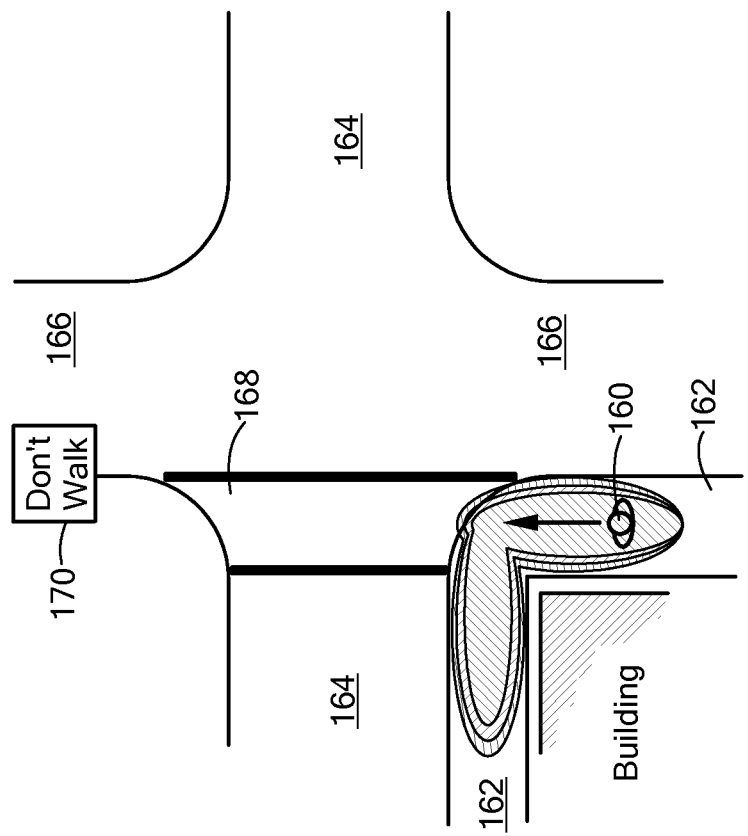
FIG. 13B is a diagrammatic view of a pedestrian moving toward a crosswalk.

Referring now to FIG. 13B, in which like elements of FIG. 13 are provided having like reference designations, in this scenario, crosswalk sign 170 indicates to pedestrian 160 that it is not safe to cross street 164 by travelling in cross-walk 168. Thus, in this scenario POM 174 shown in FIG. 13C, will more likely apply.

Referring now to FIG. 13C, exemplary non-continuous POM distribution 174 indicates that the probability of pedestrian 160 moving toward crosswalk 168 is much less than the probability of pedestrian 160 following sidewalk 162. In this example, the change in the crosswalk sign 170 is the significant factor in this change in probability values in POM 172 and POM 174. The ability of the POM methodology to readily account for external influences/factors (e.g. the state of a crosswalk sign) and account for non-continuous probability distributions (e.g. multiple primary prediction paths with intervening low probability areas) are advantages over classical future state prediction methods (e.g. Kalman filters).

Figure 14:
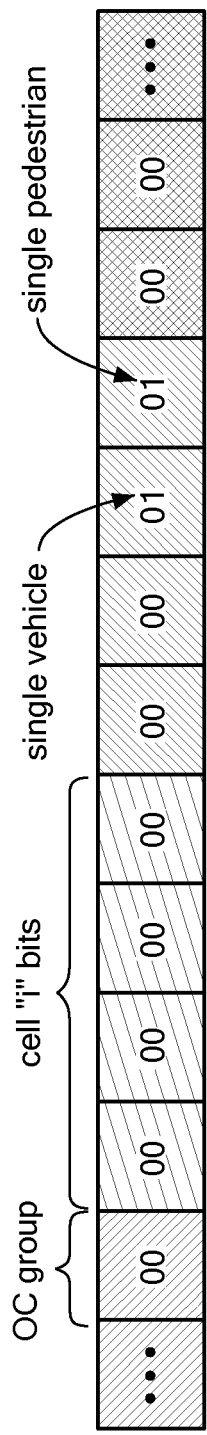
FIGS. 14 and 14A are diagrams of a collision determination pattern vector

Referring now to FIG. 14, in one embodiment, a universal pedestrian warning system (UPWS) may includes a computation-less collision detection methodology. In this technique, a collision determination pattern vector (CDPV) is introduced. The CPVD includes an object classification (OC) group. Cars and trucks may be grouped together as like "threats" in the CDPV, hi one embodiment sixteen (16) object classification result types (pedestrian, vehicle, etc.) are grouped into four (4) groupings for collision determination. Cell "i" bits refers to the CDPV bits associated with IOM cell #i.

Figure 14A:
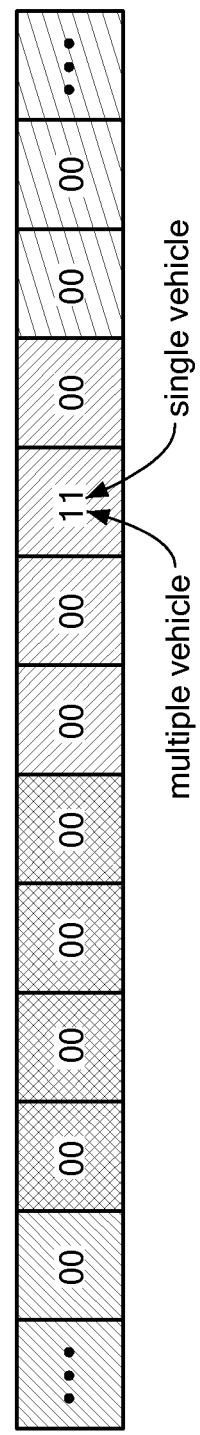

For each greater-than-zero probability in IOM cells (denoted "i"), the value of the CDPV cell (denoted CDPV(i*)) is set equal to one (1) and all other CPDVi*) cell values are set equal to zero. The number of sets of bits in the CDPV is equal to the number of cells in the IOM. FIGS. 14, 14A show that two (2) bits are used for each OC group, and there are four (4) OC groups. Thus, in this exemplary embodiment, eight (8) bits are used for each IOM cell i.

Next, a search or "hash" of CDPV for collisions of interest is performed. In the top row of FIG. 14, 0x05 (hexadecimal value 5 bits 00 00 01 01) is a pedestrian vs. vehicle collision to be checked. The system can easily be configured to detect other collisions of interest. For example, in the bottom row of FIG. 14, the 0x08 bit being set (hexadecimal value 8=bits 00 00 10 00) identifies a vehicle vs. vehicle collision to be checked. While the PWS may be deployed to detect pedestrian-vehicle collisions as a primary goal, the flexible, configurable architecture supports reconfiguring the system to also detect vehicle-vehicle collisions to provide cooperative intersection collision avoidance system (CICAS) capability. Thus, the system finds application in the Intelligent Transportation Safety arena.

It has been recognized that CPDV provides the ability to detect collisions within intersection occupancy map (IOM) data without performing any collision-specific calculations. This unique computation-less collision detection makes use of the CDPV data structure. As the IOM is populated with future projected object locations, a bit is set in the CDPV based upon each object's classification type. A plurality of bits, here two bits, are used for each object classification type. Potentially, more that two bits can be used, but in applications in which a goal is to minimize memory to be searched, two bits is preferred to reflect the necessary information. The CDPV reflects if zero, one or more objects of any grouping is predicted in a IOM cell at a future time (with any non-zero probability). A multiple vehicle-multiple pedestrian scenario would be represented in the CDPV by 0x0a (hexadecimal value a=bits 00 00 10 10).

A rapid search (e.g. a "hash") of the CDPV identifies the cell(s) containing configured collisions of interest (i.e. specific bit patterns contained within the cells are found). The corresponding cell IOM data is then further checked for collision alert thresholds.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method to perform pedestrian collision detection by an object detection system, the method comprising:
   generating, by a processing unit, an object occupancy map (OOM) having a plurality of cells;
   generating, by a processing unit, an intersection occupancy map (IOM) having a plurality of cells;
   generating, by a processing unit, a collision determination pattern vector (CDPV);
   mapping, by a processing unit, probability values of cells in the OOM over the cells of the IOM;
   for each IOM cell having a greater-than-zero probability value, assigning, by a processing unit, a value of one to a corresponding CDPV cell and assigning a value of zero to all other CDPV cells; and
   identifying, by a processing unit, bit patterns contained in CDPV cells.

2. The method of claim 1 wherein the identified bit patterns are checked for collision alert thresholds.

3. The method of claim 1 further comprising:
   populating the IOM cells with values corresponding to future projected object locations; and
   setting a bit in the CDPV based upon each object's classification type.

4. The method of claim 3 wherein a plurality of bits are used for each grouping and, if the CDPV reflects zero, one or more objects of any type is predicted in an IOM cell at a future time.

5. The method of claim 1 wherein the OOM is provided as a pedestrian occupancy map (POM).

6. The method of claim 3 wherein identifying bit patterns contained in CDPV cells comprises performing a hashing operation of the CDPV to identify specific bit patterns.

7. The method of claim 1 further comprising processing, by a path predicting circuit, the information from the sensors.

8. The method of claim 1 further comprising plotting, by a plotting circuit, the information from the sensors onto the OOM.

9. An object warning system comprising:
   a pedestrian warning system;
   a computation-less collision detection processor;
   an object occupancy map (OOM) having a plurality of cells;
   an intersection occupancy map (IOM) having a plurality of cells having stored therein probability values of cells from the OOM; and
   a collision determination pattern vector (CDPV) having a plurality of cells wherein for each IOM cell having a greater-than-zero probability value, a corresponding CDPV cell has assigned thereto a first value and wherein all other CPDV cells have assigned thereto a second different value; and
   wherein the processing unit is configured to detect pedestrians by collecting and processing sensor information received from one or more sensors.

10. The system of claim 9 wherein the identified bit patterns are checked for collision alert thresholds.

11. The system of claim 9 wherein the identification processor is configured to:
    populate the IOM cells with values corresponding to future projected object locations; and
    set a bit in the CDPV based upon each object's classification type.

12. The system of claim 11 wherein a plurality of bits are used for each grouping and, if the CDPV reflects zero, one or more objects of any type is predicted in an IOM cell at a future time.

13. The system of claim 9 wherein the OOM is a pedestrian occupancy map (POM).

14. The system of claim 11 wherein the identification processor is further configured to perform a hashing operation of the CDPV to identify specific bit patterns.

* * * * *